US010207870B2

(12) United States Patent
Sullivan et al.

(10) Patent No.: US 10,207,870 B2
(45) Date of Patent: *Feb. 19, 2019

(54) AUTONOMOUS TRANSPORTS FOR STORAGE AND RETRIEVAL SYSTEMS

(71) Applicant: SYMBOTIC LLC, Wilmington, MA (US)

(72) Inventors: Robert Sullivan, Wilmington, MA (US); John Lert, Wakefield, MA (US); Stephen C. Toebes, Chelmsford, MA (US); Foster Hinshaw, Cambridge, MA (US); Nathan Ulrich, Lee, NH (US)

(73) Assignee: Symbotic, LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,889

(22) Filed: Apr. 25, 2016

(65) Prior Publication Data

US 2016/0236866 A1      Aug. 18, 2016

Related U.S. Application Data

(63) Continuation of application No. 13/860,802, filed on Apr. 11, 2013, now Pat. No. 9,321,591, which is a
(Continued)

(51) Int. Cl.
*B65G 1/06* (2006.01)
*B65G 1/137* (2006.01)
*B65G 1/04* (2006.01)

(52) U.S. Cl.
CPC ......... *B65G 1/1373* (2013.01); *B65G 1/0492* (2013.01); *B65G 1/065* (2013.01)

(58) Field of Classification Search
CPC .... B65G 1/0492; B65G 1/065; B65G 1/1373; Y10S 901/01
(Continued)

(56) References Cited

U.S. PATENT DOCUMENTS 1,845,962 A    2/1932  Dorr
1,887,667 A   11/1932  Wheeler
(Continued)

FOREIGN PATENT DOCUMENTS

CN    202321418    7/2012
DE      4104527    8/1992
(Continued)

*Primary Examiner* — Mark C Hageman
(74) *Attorney, Agent, or Firm* — Perman & Green, LLP

(57) ABSTRACT

An autonomous transport vehicle for transferring case units to and from predefined storage areas in an automated case unit storage system, the automated case unit storage system including an array of multilevel storage racks with picking aisles passing therebetween and at least one multilevel vertical conveyor having movable shelves, the autonomous transport vehicle including a frame configured to traverse the picking aisles and a transfer deck connecting the picking aisles to the at least one multilevel vertical conveyor for transferring case units between the predefined storage areas and the at least one multilevel vertical conveyor, and a controller connected to the frame, the controller being configured to effect movement of the autonomous transport vehicle through the picking aisles for accessing each storage area within a respective level of the array of multilevel storage racks and each shelf of the at least one multilevel vertical conveyor.

12 Claims, 29 Drawing Sheets

Related U.S. Application Data continuation of application No. 12/757,312, filed on Apr. 9, 2010, now Pat. No. 8,425,173.

(60) Provisional application No. 61/168,349, filed on Apr. 10, 2009.

(58) Field of Classification Search
USPC .............................. 414/277, 279, 280, 284
See application file for complete search history.

(56) References Cited

U.S. PATENT DOCUMENTS

| | | |
|---|---|---|
| 2,606,508 A | 8/1952 | van Nes |
| 2,656,995 A | 10/1953 | Wolf |
| 2,673,689 A | 3/1954 | Bonanno |
| 2,792,234 A | 5/1957 | Page |
| 2,840,248 A | 6/1958 | Grove et al. |
| 2,877,575 A | 3/1959 | Stedt |
| 2,923,421 A | 2/1960 | de Senigon de Roumefort |
| 2,945,604 A | 7/1960 | Kroll |
| 2,996,621 A | 8/1961 | Barrett, Jr. |
| 3,161,303 A | 12/1964 | Burrows |
| 3,162,459 A | 12/1964 | Marmorine et al. |
| 3,269,744 A | 8/1966 | Dobson |
| 3,369,648 A | 2/1968 | Wentz |
| 3,370,492 A | 2/1968 | Treff |
| 3,519,149 A | 7/1970 | Saul |
| 3,554,390 A | 1/1971 | Saul |
| 3,636,586 A | 1/1972 | Bollinger et al. |
| 3,677,421 A | 7/1972 | Kintner |
| 3,732,828 A | 5/1973 | Wanner |
| 3,737,056 A | 6/1973 | Hathcock |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,774,543 A | 11/1973 | Welsh |
| 3,782,565 A | 1/1974 | Doran et al. |
| 3,789,765 A | 2/1974 | Schultz |
| 3,802,580 A | 4/1974 | Castaldi |
| 3,811,383 A | 5/1974 | Butzow |
| 3,822,647 A | 7/1974 | Hill et al. |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,965,619 A | 6/1976 | Engle |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,214,535 A | 7/1980 | Gerhard |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,786,229 A | 11/1988 | Henderson |
| 4,811,229 A | 3/1989 | Wilson |
| 4,812,985 A | 3/1989 | Hambrick et al. |
| 4,856,956 A | 8/1989 | Zur |
| 4,862,807 A | 9/1989 | Guadagno |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennan et al. |
| 4,942,826 A | 7/1990 | Erickson |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,226,782 A | 7/1993 | Rigling |
| 5,238,100 A | 8/1993 | Rose, Jr. et al. |
| 5,265,944 A | 11/1993 | Gloceri |
| 5,271,703 A | 12/1993 | Lindqvist et al. |
| 5,273,392 A | 12/1993 | Bernard et al. |
| 5,281,901 A | 1/1994 | Yardley et al. |
| 5,286,157 A | 2/1994 | Vainio et al. |
| 5,307,888 A | 5/1994 | Urvoy |
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,362,197 A | 11/1994 | Rigling |
| 5,370,492 A | 12/1994 | Gleyze et al. |
| 5,377,851 A | 1/1995 | Asano et al. |
| 5,377,910 A | 1/1995 | Newton et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,410,969 A | 5/1995 | Rene et al. |
| 5,418,732 A | 5/1995 | McFadin |

(56) References Cited

U.S. PATENT DOCUMENTS

| | | |
|---|---|---|
| 5,421,265 A | 6/1995 | Suigmoto et al. |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poutet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Muller et al. |
| 5,525,884 A | 6/1996 | Sugiura et al. |
| 5,529,165 A | 6/1996 | Shupert |
| 5,548,516 A | 8/1996 | Gudat et al. |
| 5,564,880 A | 10/1996 | Lederer |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,667,230 A | 9/1997 | Riley et al. |
| 5,668,724 A | 9/1997 | Ehret et al. |
| 5,707,199 A | 1/1998 | Faller |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,801,506 A | 9/1998 | Netzler |
| 5,802,980 A | 9/1998 | Hofmiller |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, III et al. |
| 5,839,872 A | 11/1998 | Goto et al. |
| 5,847,537 A | 12/1998 | Parmley, Sr. |
| 5,857,413 A | 1/1999 | Ward |
| 5,866,469 A | 2/1999 | Hays |
| 5,918,951 A | 7/1999 | Rudd, III |
| 5,927,926 A | 7/1999 | Yagi et al. |
| 5,928,058 A | 7/1999 | Francis et al. |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,149,366 A | 11/2000 | Deandrea |
| 6,158,566 A | 12/2000 | Pollock |
| 6,220,676 B1 | 4/2001 | Rudd, III |
| 6,257,597 B1 | 7/2001 | Galazin |
| 6,272,406 B2 | 8/2001 | Alofs et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,425,723 B1 | 7/2002 | Okada et al. |
| 6,439,131 B1 | 8/2002 | Higgins |
| 6,439,955 B1 | 8/2002 | Feketo |
| 6,503,043 B1 | 1/2003 | Smith et al. |
| 6,508,102 B1 | 1/2003 | Margolis et al. |
| 6,563,128 B2 | 5/2003 | Lublin et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,808,058 B2 | 10/2004 | Shiohara |
| 6,851,921 B2 | 2/2005 | Haag |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,058,866 B2 | 6/2006 | Flanagan et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley et al. |
| 7,793,742 B2 | 9/2010 | Donaldson et al. |

(56) References Cited

U.S. PATENT DOCUMENTS

| | | |
|---|---|---|
| 7,801,644 B2 | 9/2010 | Bruemmer et al. |
| 7,826,919 B2 | 11/2010 | D'Andrea et al. |
| 7,826,926 B2 | 11/2010 | Myeong et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara et al. |
| 7,967,354 B2 | 6/2011 | Faulkner et al. |
| 7,974,738 B2 | 7/2011 | Bruemmer et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,066 B2 | 9/2011 | Reverte et al. |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 9,020,639 B2 | 4/2015 | Bewley et al. |
| 9,037,286 B2 | 5/2015 | Lert |
| 9,327,903 B2 | 5/2016 | Toebes et al. |
| 2002/0029719 A1 | 3/2002 | Matsukawa |
| 2002/0037208 A1 | 3/2002 | Patrito |
| 2002/0076307 A1 | 6/2002 | Fallin et al. |
| 2003/0033217 A1 | 2/2003 | Cutlip |
| 2003/0051544 A1 | 3/2003 | Hong |
| 2003/0074125 A1 | 4/2003 | Walenty et al. |
| 2003/0185656 A1 | 10/2003 | Hansl |
| 2003/0200129 A1 | 10/2003 | Klaubauf et al. |
| 2004/0093116 A1 | 5/2004 | Mountz |
| 2004/0136821 A1 | 7/2004 | Berger et al. |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0095095 A1 | 5/2005 | Hansl |
| 2005/0131645 A1 | 6/2005 | Panopoulos |
| 2005/0151360 A1 | 7/2005 | Bertrand et al. |
| 2005/0166787 A1 | 8/2005 | Astrom |
| 2005/0212478 A1 | 9/2005 | Takenaka |
| 2005/0217532 A1 | 10/2005 | Conneally |
| 2005/0238455 A1 | 10/2005 | Toteff |
| 2005/0238465 A1 | 10/2005 | Ruazumov |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz et al. |
| 2006/0216137 A1 | 9/2006 | Sakata et al. |
| 2006/0232025 A1 | 10/2006 | Braud |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0065258 A1 | 3/2007 | Benedict et al. |
| 2007/0071585 A1 | 3/2007 | Henkel |
| 2007/0125727 A1 | 6/2007 | Winkler |
| 2007/0177011 A1 | 8/2007 | Lewin et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0297879 A1 | 12/2007 | Yuyama et al. |
| 2008/0001372 A1 | 1/2008 | Hoffman et al. |
| 2008/0065265 A1 | 3/2008 | Ozick et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0074545 A1 | 3/2009 | Lert, Jr. et al. |
| 2009/0099879 A1 | 4/2009 | Ouimet |
| 2009/0114115 A1 | 5/2009 | Minges |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0265031 A1 | 10/2009 | Tachibana et al. |
| 2010/0043665 A1 | 2/2010 | Brigham |
| 2010/0044124 A1 | 2/2010 | Radke et al. |
| 2010/0044977 A1 | 2/2010 | Hughes et al. |
| 2010/0076591 A1 | 3/2010 | Lert, Jr. |
| 2010/0086385 A1 | 4/2010 | Shani |
| 2010/0102532 A1 | 4/2010 | Timoney et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0145507 A1 | 6/2010 | Blust et al. |
| 2010/0218697 A1 | 9/2010 | Sugimoto |
| 2010/0224427 A1 | 9/2010 | Nuchter et al. |
| 2010/0234995 A1 | 9/2010 | Zini et al. |
| 2010/0272546 A1 | 10/2010 | Wolkerstorfer |
| 2010/0286905 A1 | 11/2010 | Goncalves et al. |
| 2010/0290874 A1 | 11/2010 | Wolkerstorfer |
| 2010/0316469 A1 | 12/2010 | Lert et al. |
| 2010/0324815 A1 | 12/2010 | Hiruta et al. |
| 2011/0008138 A1 | 1/2011 | Yamashita |
| 2011/0068943 A1 | 3/2011 | Lane, Jr. |
| 2011/0090064 A1 | 4/2011 | Dahms et al. |
| 2011/0106339 A1 | 5/2011 | Phillips et al. |
| 2011/0130974 A1 | 6/2011 | Yngve et al. |
| 2011/0176895 A1 | 7/2011 | Kortelainen |
| 2011/0185975 A1 | 8/2011 | van Den Berg et al. |
| 2011/0202175 A1 | 8/2011 | Romanov et al. |
| 2011/0231016 A1 | 9/2011 | Goulding |
| 2011/0271469 A1 | 11/2011 | Ziegler et al. |
| 2012/0185122 A1 | 7/2012 | Sullivan et al. |
| 2012/0189409 A1 | 7/2012 | Toebes et al. |
| 2012/0189416 A1 | 7/2012 | Toebes et al. |
| 2012/0247239 A1 | 10/2012 | Hortig et al. |
| 2012/0277940 A1 | 11/2012 | Kumar et al. |
| 2012/0299260 A1 | 11/2012 | Goertzen et al. |
| 2013/0061420 A1 | 3/2013 | Vanderstegen-Drake et al. |
| 2013/0094926 A1 | 4/2013 | Olszak et al. |
| 2013/0142599 A1 | 6/2013 | McDowell, Jr. et al. |
| 2014/0350725 A1 | 11/2014 | Lafary et al. |
| 2015/0081089 A1 | 3/2015 | Kapust et al. |
| 2015/0150429 A1 | 6/2015 | Y00 et al. |
| 2015/0314446 A1 | 11/2015 | Day et al. |
| 2015/0336741 A1 | 11/2015 | Ahammer et al. |
| 2016/0000282 A1 | 1/2016 | Vanderstegen-Drake et al. |
| 2016/0121486 A1 | 5/2016 | Lipinski et al. |
| 2017/0083020 A1 | 3/2017 | Purwin et al. |

FOREIGN PATENT DOCUMENTS

| | | |
|---|---|---|
| DE | 20011661 | 12/2000 |
| DE | 10142395 | 11/2002 |
| DE | 102011012950 | 9/2012 |
| EP | 0466004 | 1/1992 |
| EP | 0499276 | 8/1992 |
| EP | 04990276 | 8/1992 |
| EP | 0647575 | 4/1995 |
| EP | 0737630 | 10/1996 |
| EP | 1193195 | 4/2002 |
| EP | 1598291 | 11/2005 |
| EP | 1627830 | 2/2006 |
| EP | 1775240 | 4/2007 |
| EP | 2039580 | 3/2009 |
| FR | 2730715 | 8/1996 |
| JP | 6337007 | 2/1988 |

(56) References Cited

FOREIGN PATENT DOCUMENTS

| | | |
|---|---|---|
| JP | 061309 | 1/1994 |
| JP | 07157013 | 6/1995 |
| JP | 07187330 | 7/1995 |
| JP | 081553 | 1/1996 |
| JP | 08113321 | 5/1996 |
| JP | 08133426 | 5/1996 |
| JP | 08258763 | 10/1996 |
| JP | 11124298 | 5/1999 |
| JP | 11180697 | 7/1999 |
| JP | 2000118615 | 4/2000 |
| JP | 2000122720 | 4/2000 |
| JP | 2001344020 | 12/2001 |
| JP | 2002356207 | 12/2001 |
| JP | 2003321102 | 11/2003 |
| JP | 2004043109 | 2/2004 |
| JP | 3102245 | 7/2004 |
| JP | 2005138956 | 6/2005 |
| JP | 2005206259 | 8/2005 |
| JP | 2008023639 | 2/2008 |
| JP | 2008510673 | 4/2008 |
| JP | 2008100825 | 5/2008 |
| JP | 2009513457 | 4/2009 |
| JP | 2010158942 | 7/2010 |
| JP | 4735387 | 7/2011 |
| JP | 2012071929 | 4/2012 |
| JP | 2007131383 | 5/2017 |
| TW | 201022108 | 6/2010 |
| WO | 8501493 | 4/1985 |
| WO | 9534491 | 12/1995 |
| WO | 0187648 | 11/2001 |
| WO | 2005009324 | 2/2005 |
| WO | 2005056943 | 6/2005 |
| WO | 2006024035 | 3/2006 |
| WO | 2006095047 | 9/2006 |
| WO | 2007011814 | 1/2007 |
| WO | 2008152245 | 12/2008 |
| WO | 2009098573 | 8/2009 |
| WO | 2009106988 | 9/2009 |
| WO | 2010080539 | 7/2010 |
| WO | 2010118412 | 10/2010 |

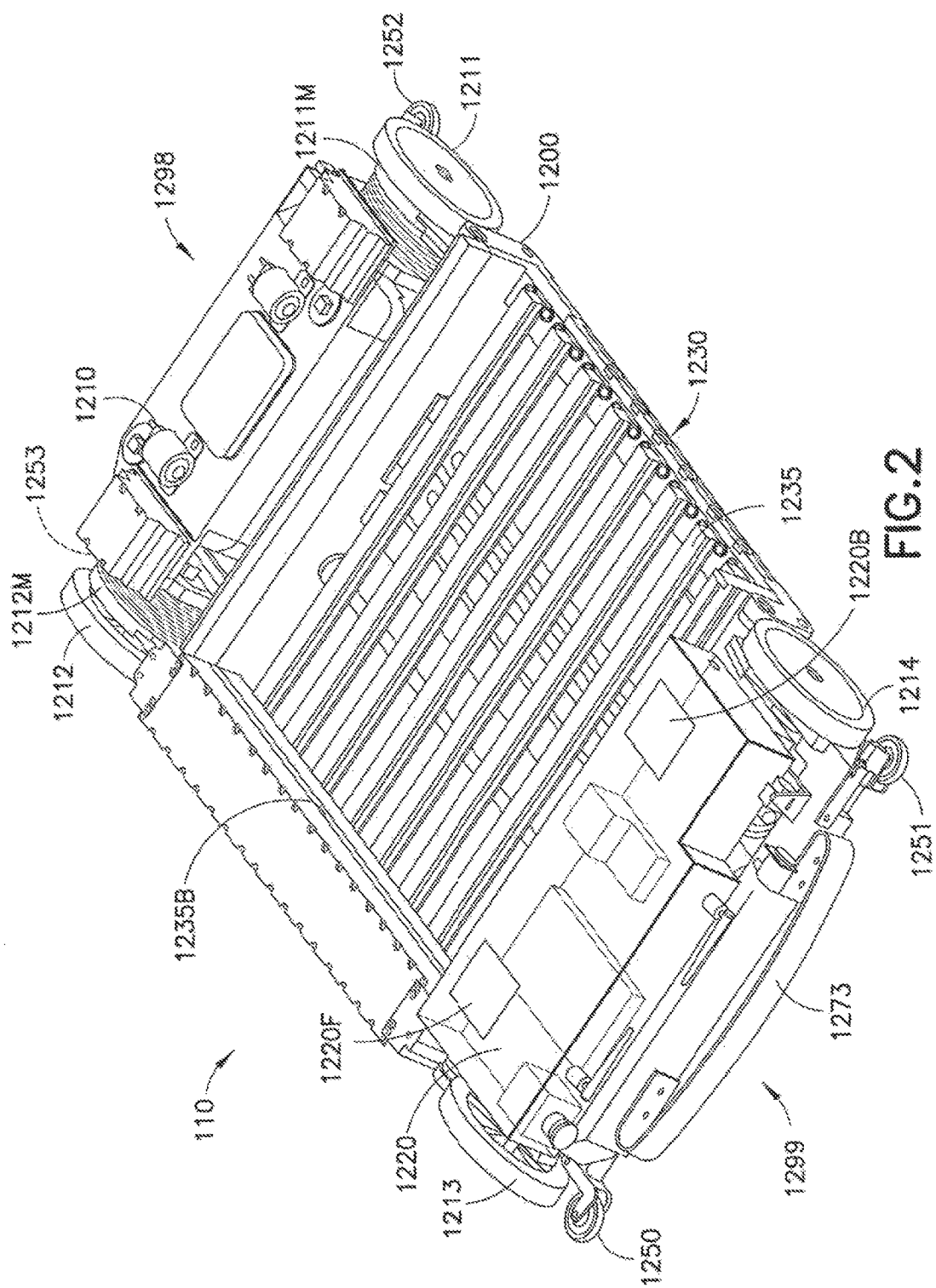

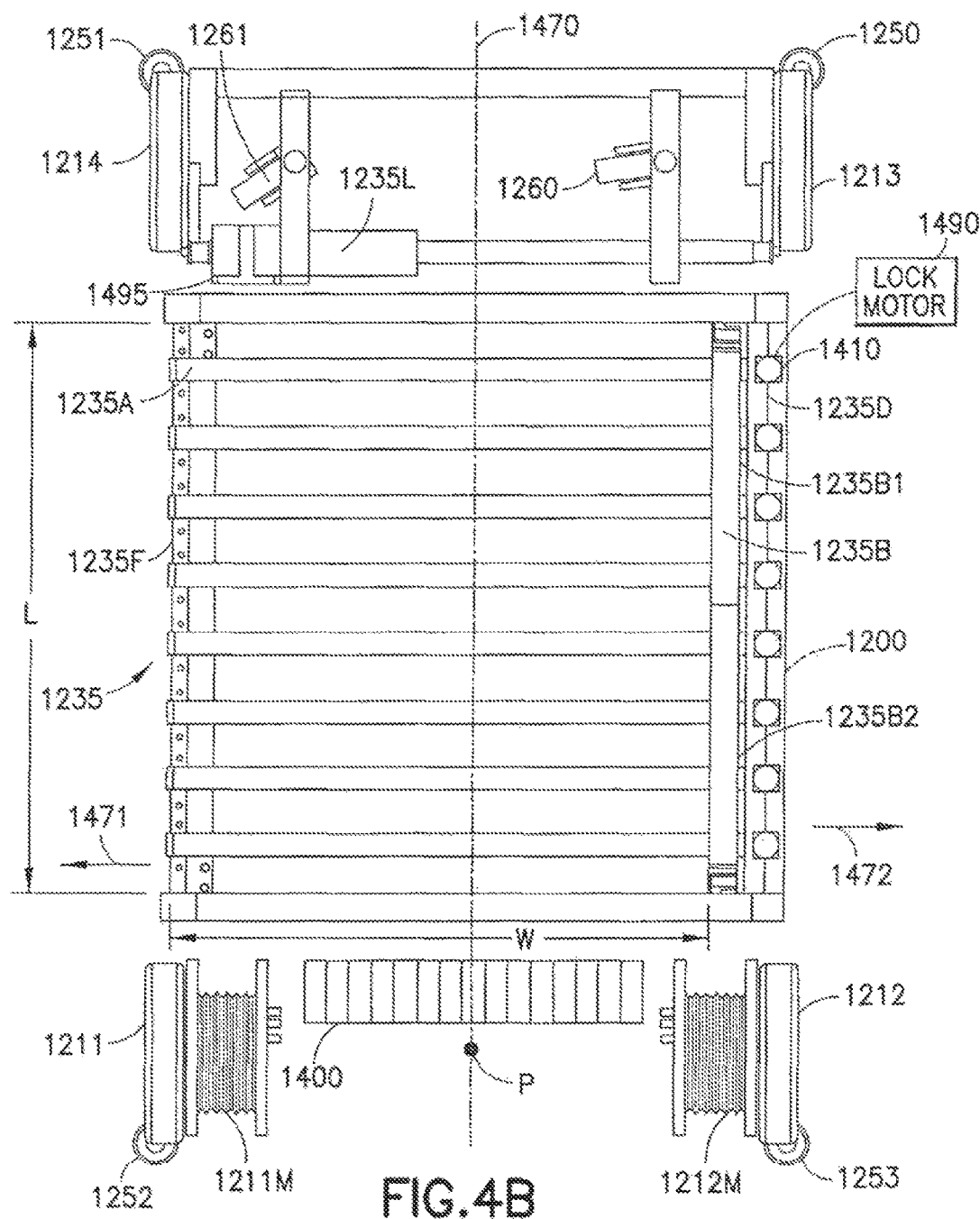

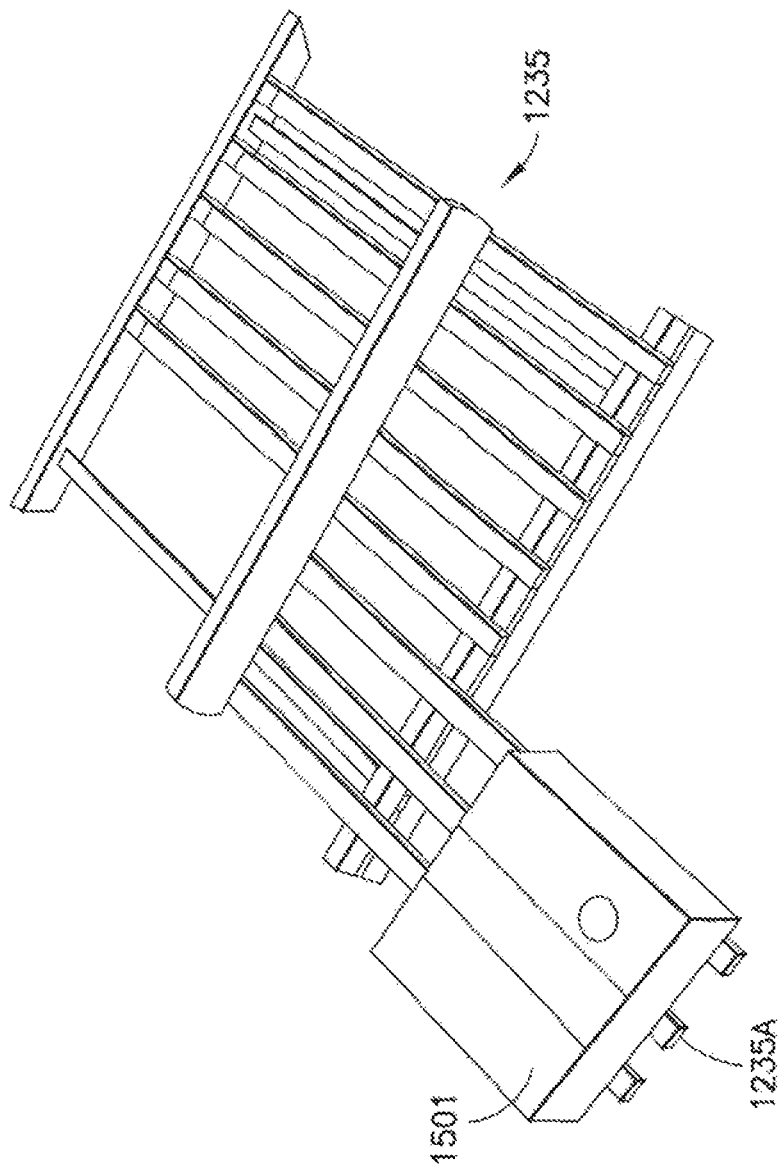

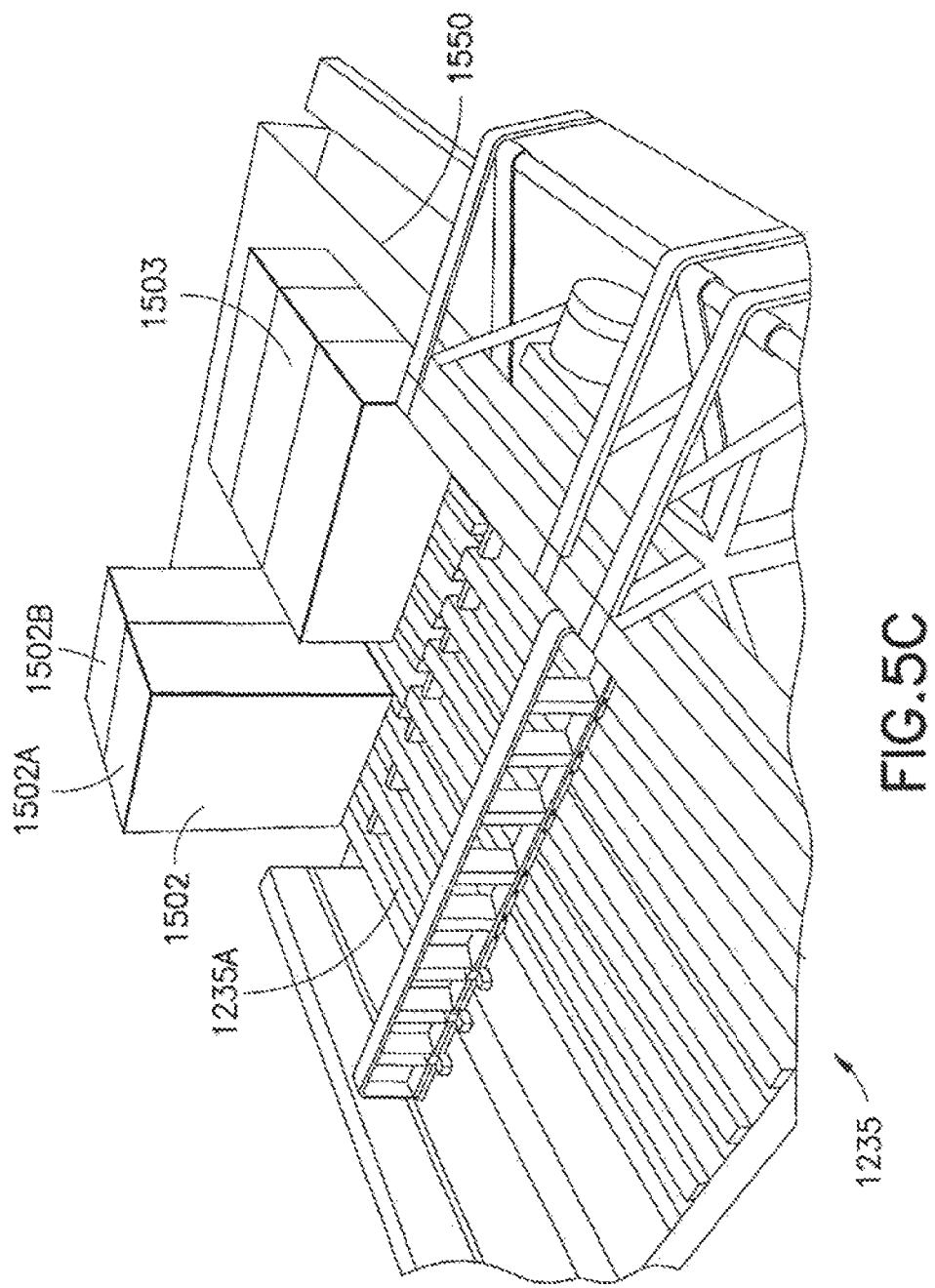

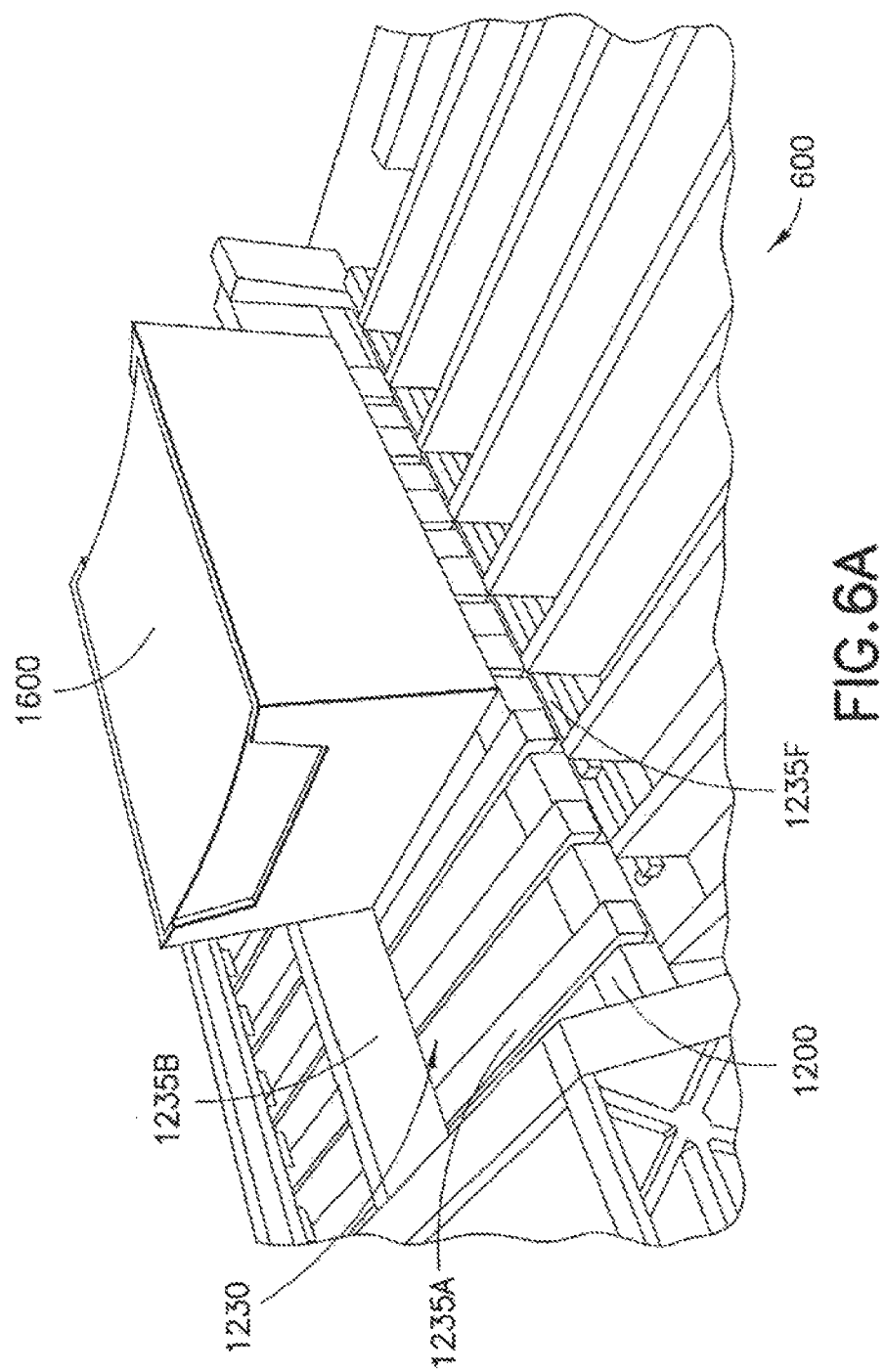

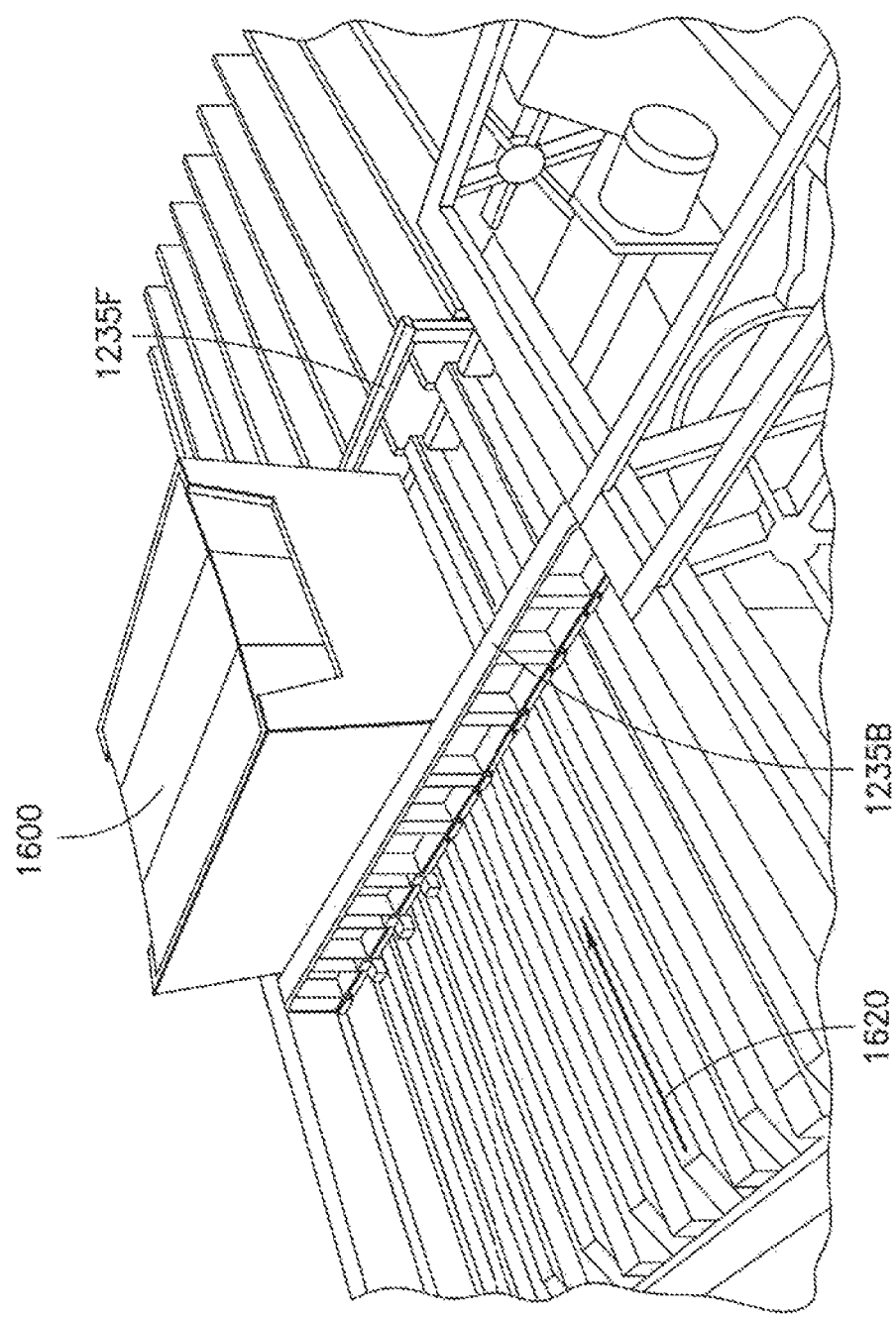

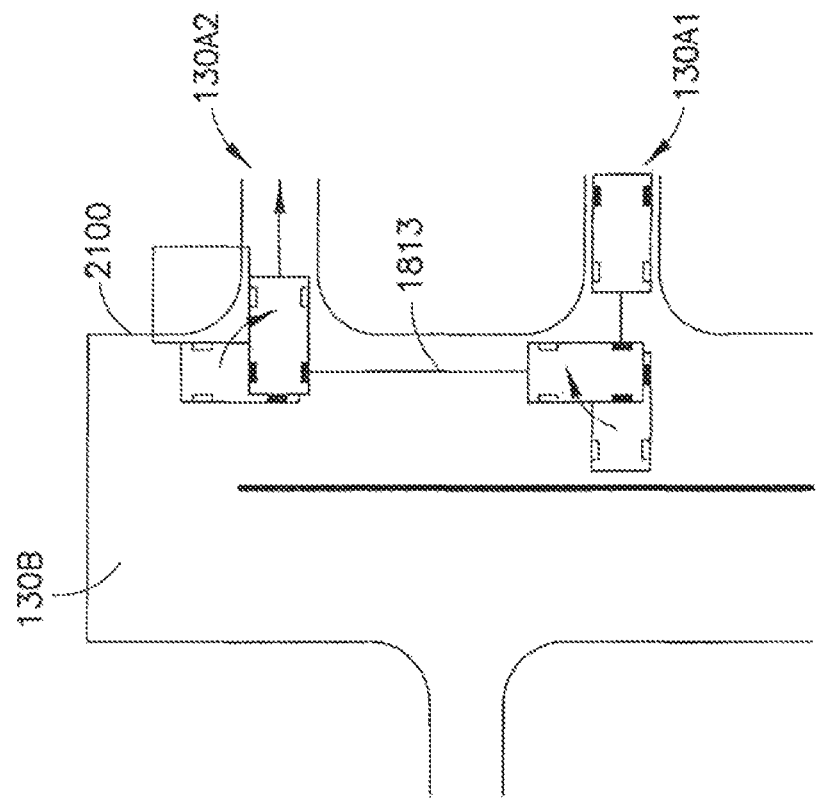
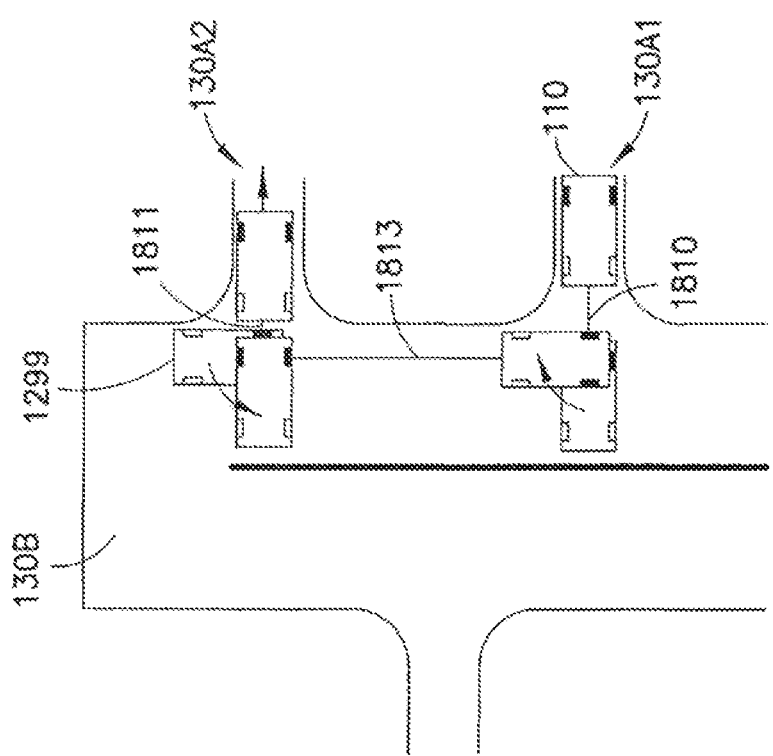

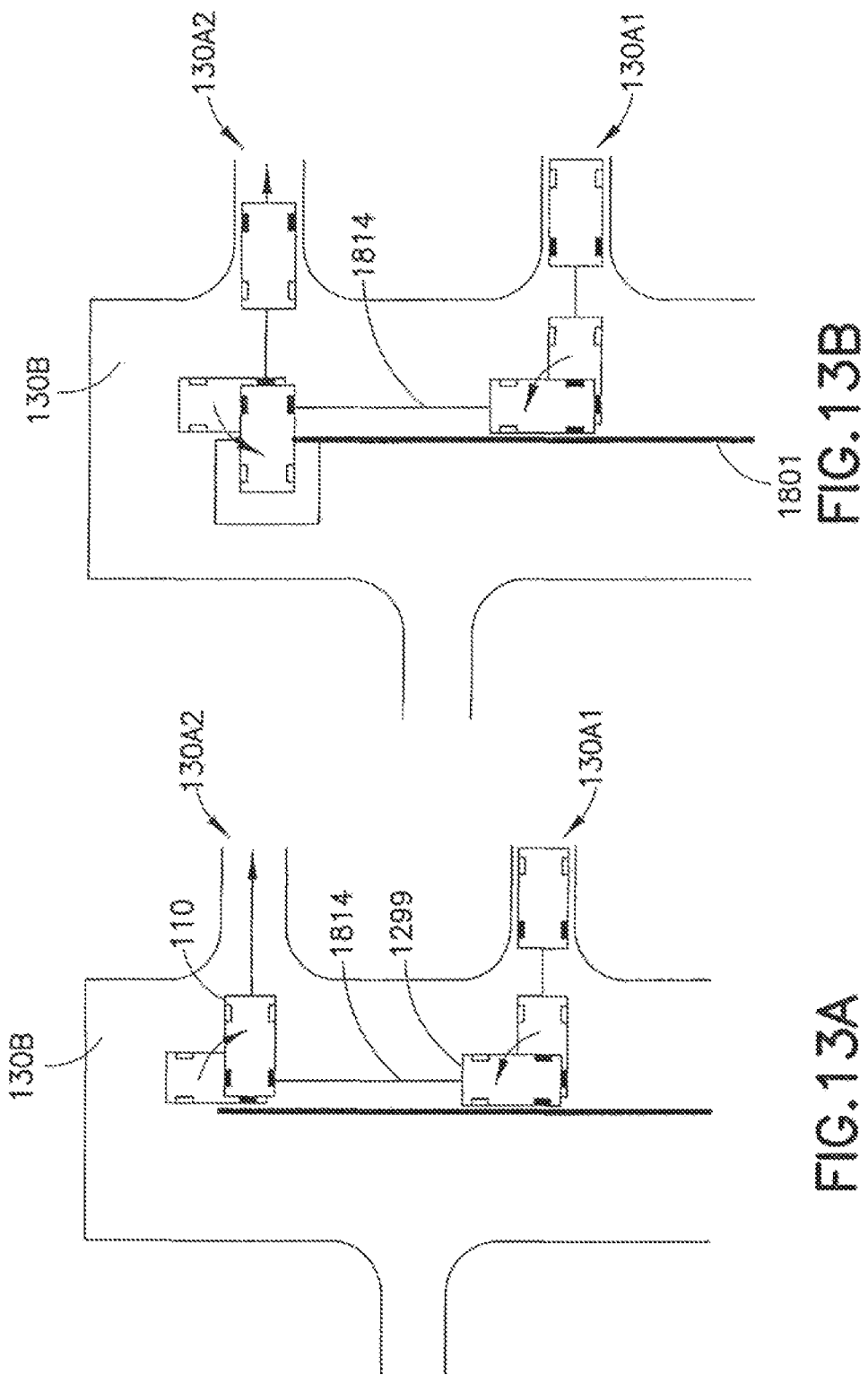

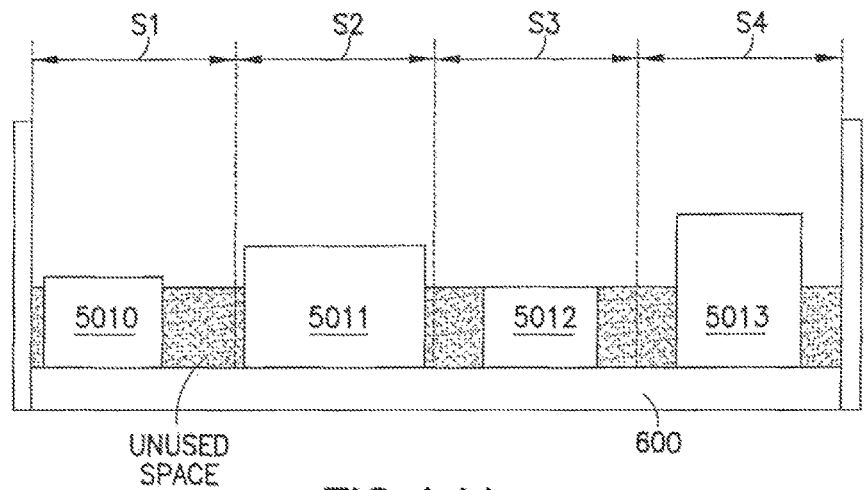
FIG.14A
PRIOR ART
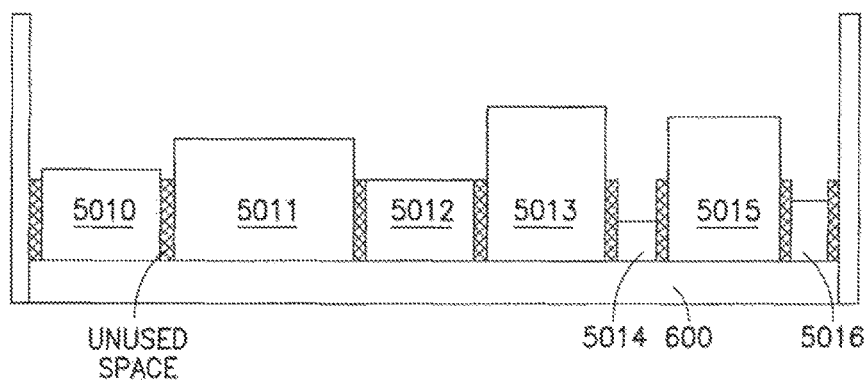
FIG.14B
FIG.14C

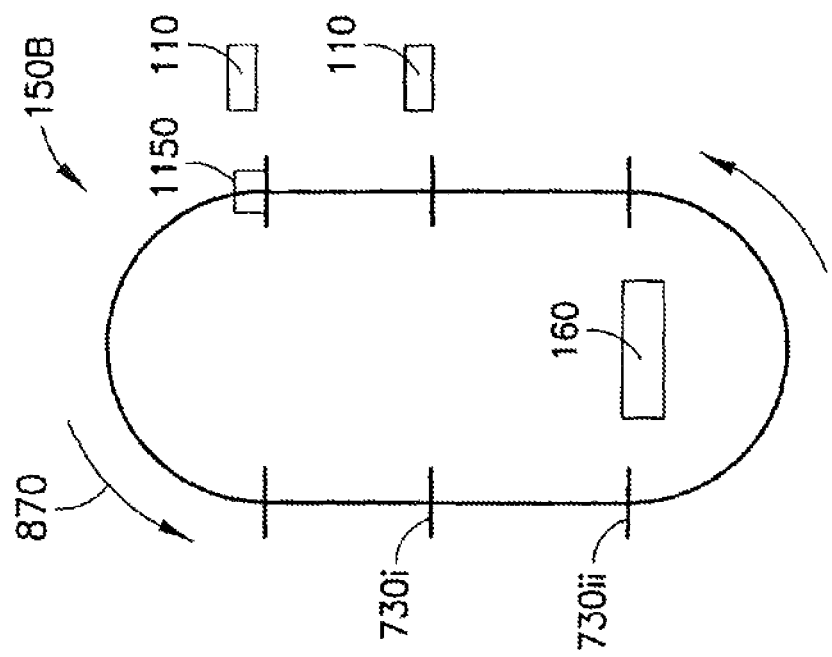
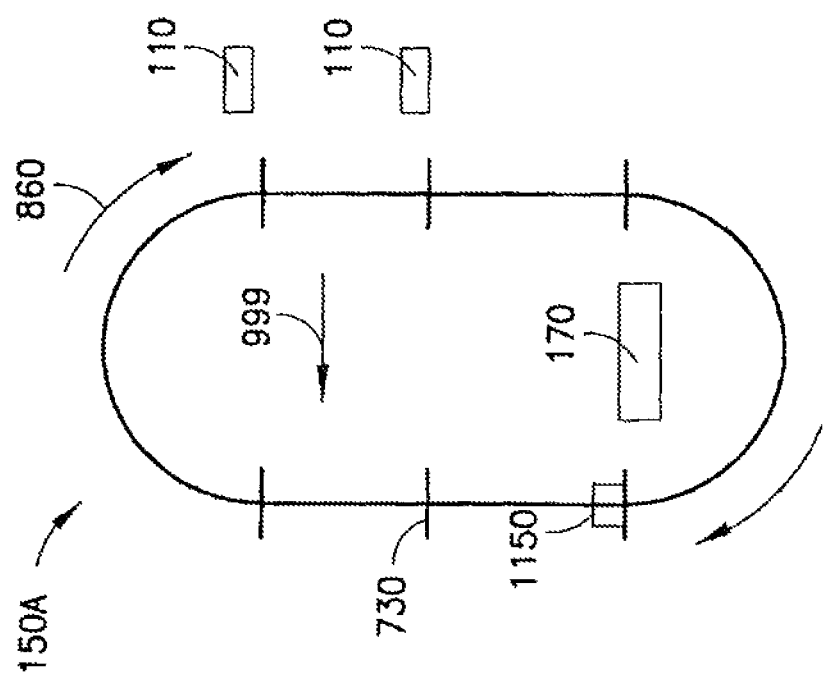

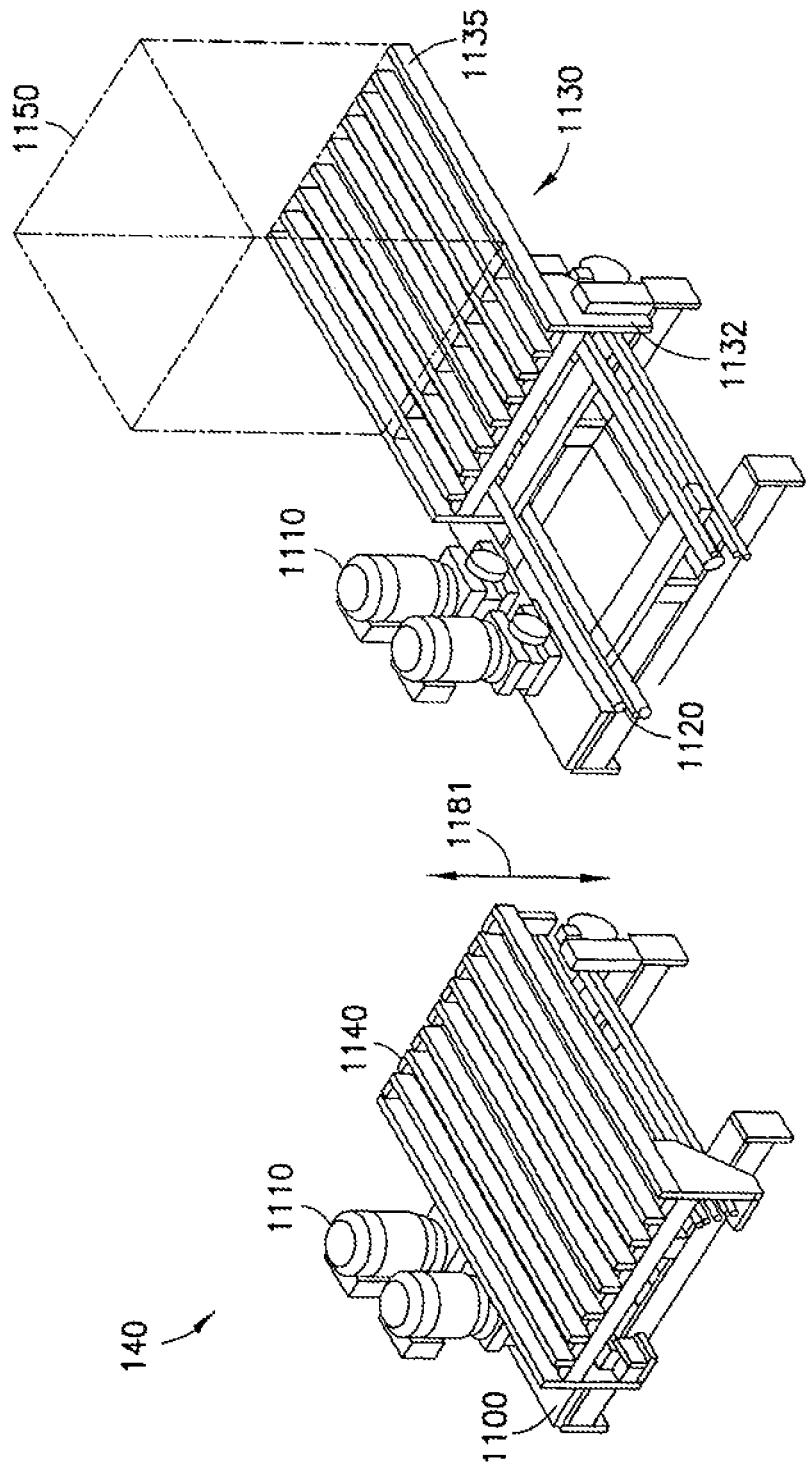

AUTONOMOUS TRANSPORTS FOR STORAGE AND RETRIEVAL SYSTEMS

CROSS REFERENCE TO RELATED APPLICATIONS

This application is a continuation of U.S. patent application Ser. No. 13/860,802 filed on Apr. 11, 2013 (now U.S. Pat. No. 9,321,591 issued on Apr. 26, 2016) which is a continuation of U.S. patent application Ser. No. 12/757,312 filed on Apr. 9, 2010 (now U.S. Pat. No. 8,425,173 issued on Apr. 23, 2013) and claims the benefit of U.S. Provisional Patent Application No. 61/168,349 filed on Apr. 10, 2009, the disclosures of which are incorporated herein by reference in their entireties.

BACKGROUND

1. Field

The exemplary embodiments generally relate to material handling systems and, more particularly, to transports for automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers or on pallets generally does not allow for the retrieval of individual case units within those carriers or pallets without transporting the carriers or pallets to a workstation for manual or automated removal of the individual items.

It would be advantageous to have a storage and retrieval system for efficiently storing and retrieving individual case units without containing those case units in a carrier or on a pallet.

BRIEF DESCRIPTION OF THE DRAWINGS

The foregoing aspects and other features of the disclosed embodiments are explained in the following description, taken in connection with the accompanying drawings, wherein:

FIGS. 2 and 3A-3C illustrate a transport robot in accordance with an exemplary embodiment;

FIGS. 4A and 4B illustrate partial schematic views of the transport robot of FIGS. 2, 3A and 3B in accordance with an exemplary embodiment;

FIGS. 5A-5C and 6A-6D illustrate a portion of a transfer arm of the transport robot of FIGS. 12, 13A and 13B in accordance with an exemplary embodiment;

FIGS. 11A-11E, 12A, 12B, 13A and 13B schematically illustrate exemplary operational paths of a transport robot in accordance with the exemplary embodiments;

FIG. 14A illustrates a conventional organization of item storage in a storage bay;

FIG. 14B illustrates an organization of items in a storage bay in accordance with an exemplary embodiment;

FIG. 14C illustrates a comparison of unused storage space between the item storage of FIG. 14A and the item storage of FIG. 14B;

FIGS. 16A, 16B, 16C, and 16D illustrate schematic views of a conveyor system in accordance with an exemplary embodiment;

FIGS. 17A-17D schematically illustrate a transfer station in accordance with an exemplary embodiment;

DETAILED DESCRIPTION OF THE EXEMPLARY EMBODIMENT(S)

Figure 1:
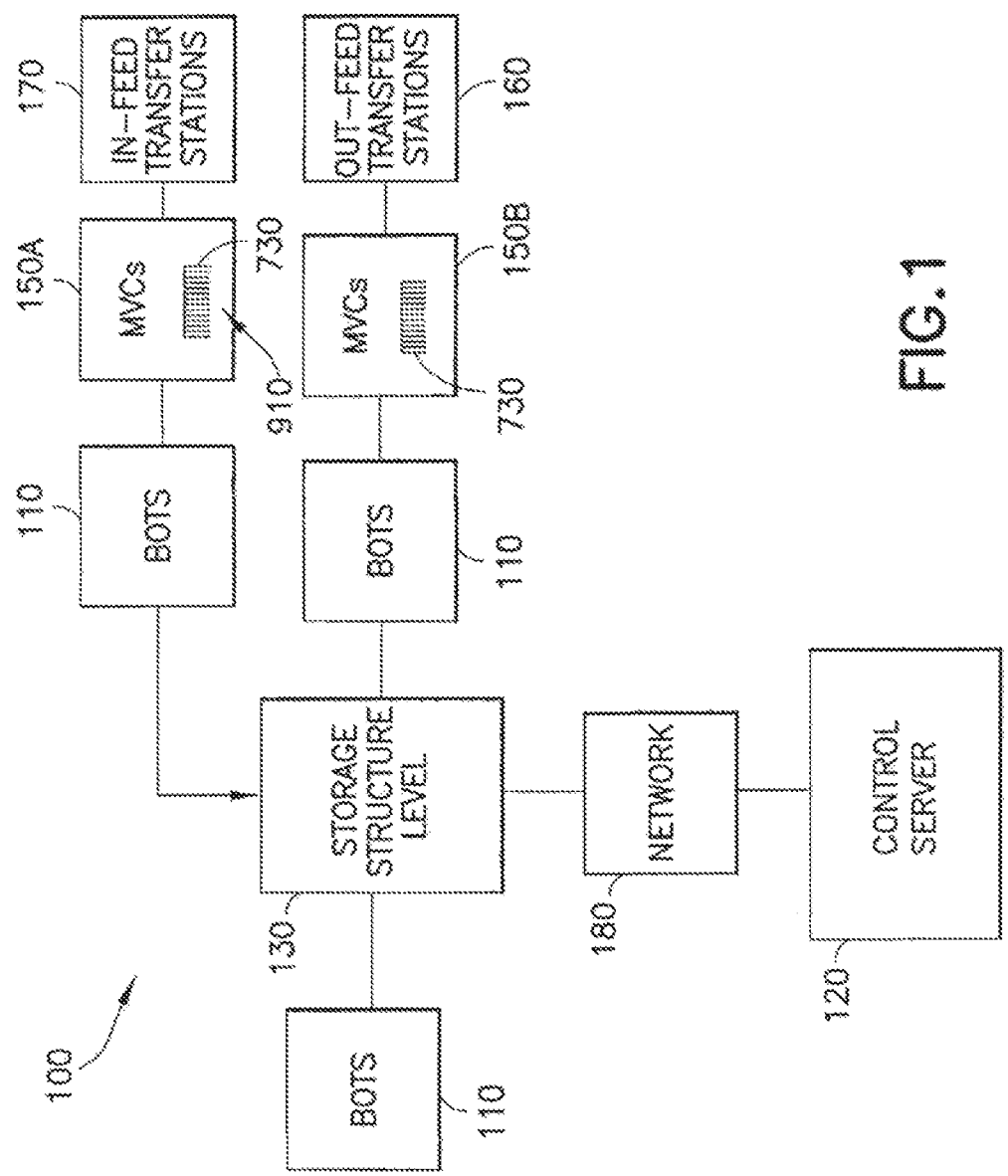
FIG. 1 schematically illustrates an exemplary storage and retrieval system in accordance with an exemplary embodiment.

FIG. 1 generally schematically illustrates a storage and retrieval system 100 in accordance with an exemplary embodiment. Although the embodiments disclosed will be described with reference to the embodiments shown in the drawings, it should be understood that the embodiments disclosed can be embodied in many alternate forms. In addition, any suitable size, shape or type of elements or materials could be used.

In accordance with one exemplary embodiment the storage and retrieval system 100 may operate in a retail distribution center or warehouse to, for example, fulfill orders received from retail stores for case units (where case units as used herein means items not stored in trays, on totes or on pallets, e.g. uncontained). It is noted that the case units may include cases of items (e.g. case of soup cans, boxes of cereal, etc.) or individual items that are adapted to be taken off of or placed on a pallet. In accordance with the exemplary embodiments, shipping cases or case units (e.g. cartons, barrels, boxes, crates, jugs, or any other suitable device for holding items) may have variable sizes and may be used to hold items in shipping and may be configured so they are capable of being palletized for shipping. It is noted that when, for example, pallets of items arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In alternate embodiments the storage and retrieval system described herein may be applied to any environment in which items are stored and retrieved.

The storage and retrieval system 100 may be configured for installation in, for example, existing warehouse structures or adapted to new warehouse structures. In one exemplary embodiment, the storage and retrieval system 100 may include in-feed and out-feed transfer stations 170, 160, multilevel vertical conveyors 150A, 150B, a storage structure 130, and a number of autonomous vehicular transport robots 110 (referred to herein as "bots"). In alternate embodiments the storage and retrieval system may also include robot or bot transfer stations (as described in, for example, U.S. patent application Ser. No. 12/757,220, entitled "STORAGE AND RETRIEVAL SYSTEM," previously incorporated by reference herein) that may provide an indirect interface between the bots and the multilevel vertical conveyor 150A, 150B. The in-feed transfer stations 170 and out-feed transfer stations 160 may operate together with their respective multilevel vertical conveyors 150A, 150B for transferring items to and from one or more levels of the storage structure 130. The multilevel vertical conveyors may be substantially similar to those described in U.S. patent application Ser. No. 12/757,354, entitled "LIFT INTERFACE FOR STORAGE AND RETRIEVAL SYSTEMS,", previously incorporated by reference herein in its entirety. It is noted that while the multilevel vertical conveyors are described herein as being dedicated inbound conveyors 150A and outbound conveyors 150B, in alternate embodiments each of the conveyors 150A, 150B may be used for both inbound and outbound transfer of case units/items from the storage and retrieval system. The bots 110 may be configured to place items, such as the above described retail merchandise, into picking stock in the one or more levels of the storage structure 130 and then selectively retrieve ordered items for shipping the ordered items to, for example, a store or other suitable location. In one exemplary embodiment, the bots 110 may interface directly with the multilevel vertical conveyors 150A, 150B through, for example, access provided by transfer areas 295 (FIGS. 8 and 11A-11E) while in other exemplary embodiments, the bots 110 may interface indirectly with the respective multilevel vertical conveyors 150A, 150B in any suitable manner such as through bot transfer stations.

The storage structure 130 may be substantially similar to the storage structure described in U.S. patent application Ser. No. 12/757,381, entitled "STORAGE AND RETRIEVAL SYSTEM," and U.S. patent application Ser. No. 12/757,220, entitled "STORAGE AND RETRIEVAL SYSTEM,", previously incorporated herein by reference in their entirety. For example, the storage structure 130 may include multiple levels of storage rack modules, where each level includes picking aisles 130A (FIGS. 8-9D) that provide access to the storage racks, transfer decks 130B (FIGS. 8-9D) that provide access to the picking aisles, and charging stations (not shown) that are configured to replenish, for example, a battery pack of the bots 110. The bots 110 and other suitable features of the storage and retrieval system 100 may be controlled by, for example, one or more central system control computers (e.g. control server) 120 through, for example, any suitable network 180. In one example, the central control computer and network may be substantially similar to those described in U.S. patent application Ser. No. 12/757,354, entitled "LIFT INTERFACE FOR STORAGE AND RETRIEVAL SYSTEMS,", U.S. patent application Ser. No. 12/757,381, entitled "STORAGE AND RETRIEVAL SYSTEM,"; U.S. patent application Ser. No. 12/757,220, entitled "STORAGE AND RETRIEVAL SYSTEM,"; and U.S. patent application Ser. No. 12/757,337, entitled "CONTROL SYSTEM FOR STORAGE AND RETRIEVAL SYSTEMS,", previously incorporated by reference herein in their entirety. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system, which in turn manages the warehouse facility as a whole.

As an exemplary operation of an order fulfillment process of the storage and retrieval system 100, case units for replenishing the picking stock are input at, for example, depalletizing workstations so that case units bundled together on pallets (or other suitable container-like transport supports) are separated and individually carried on, for example, conveyors or other suitable transfer mechanisms (e.g. manned or automated carts, etc.) to the in-feed transfer stations 170. The in-feed transfer stations 170 assembles the case units into pickfaces (e.g. one or more case units that may form a bot load) and loads the pickfaces onto respective multilevel vertical conveyors 150A, which carry the pickfaces to a predetermined level of the storage structure 130. Bots 110 located on the predetermined level of the storage structure 130 interface with the multilevel vertical conveyor 150A at, for example, the transfer areas 295 for removing the pickfaces from the multilevel vertical conveyor 150A. The bots 110 transfer the pickfaces from the multilevel vertical conveyors 150A to a predetermined storage module of the storage structure 130. When an order for individual case units is made the bots 110 retrieve the corresponding pickfaces from a designated storage module of the storage structure 130 and transfer the ordered case units to transfer areas 295 located on a level of the storage structure 130 from which the ordered case units were picked. The bots 110 interfaces with multilevel vertical conveyor 150B for transferring the pickfaces to the multilevel vertical conveyor 150B. The multilevel vertical conveyor 150B transports the ordered case unit(s) of the pickface to the out-feed transfer stations 160 where the individual case units are transported to palletizing workstations by conveyors 230 where the individual case units are placed on outbound pallets (or other suitable container-like transport supports) for shipping to a customer.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit(s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf 730 of a multilevel vertical conveyor, transports the uncontained case unit(s) to a predetermined storage area of the storage structure 130 and places the uncontained case unit(s) in the predetermined storage area (and vice versa). In one exemplary embodiment, the storage and retrieval system 100 may include a bot positioning system for positioning the bot adjacent the shelves 730 of the multilevel vertical conveyor 150A, 150B for picking/placing a desired pickface from a predetermined one of the shelves 730 (e.g. the bot 110 is positioned so as to be aligned with the pickface on the shelf or a position on the shelf designated to receive the pickface). The bot positioning system may also be configured to correlate the extension of the bot transfer arm 1235 with the movement (e.g. speed and location) of the shelves 730 so that the transfer arm 1235 is extended and retracted to remove (or place) pickfaces from predetermined shelves 730 of the multilevel vertical conveyors 150A, 150B. It is noted that at least a portion of the bot positioning system may reside within the control system 1220 (FIG. 7) of the bot 110.

Referring now to FIGS. 2-6D, the bots 110 that transfer loads (e.g. pickfaces formed of at least one case unit) between, for example, the multilevel vertical conveyors 150A, 150B and the storage shelves of a respective level of storage structure 130 will be described. It is noted that in one exemplary embodiment the bots 110 may transfer loads directly to and/or from the multilevel vertical conveyors 150A, 150B as will be described below, while in alternate embodiments the bots 110 may interface with the multilevel vertical conveyors indirectly such as through the bot transfer stations. In one example, the bots 110 may be configured for substantially continuous operation. For exemplary purposes only, the bots 110 may have a duty cycle of about ninety-five (95) percent. In alternate embodiments the bots may have any suitable duty cycle and operational periods.

As can be seen in FIG. 2, the bots 110 generally include a frame 1200, a drive system 1210, a control system 1220, and a payload area 1230. The drive system 1210 and control system 1220 may be mounted to the frame in any suitable manner. The frame may form the payload area 1230 and be configured for movably mounting a transfer arm or effector 1235 to the bot 110.

In one exemplary embodiment, the drive system 1210 may include two drive wheels 1211, 1212 disposed at a drive end 1298 of the bot 110 and two idler wheels 1213, 1214 disposed at a driven end 1299 of the bot 110. The wheels 1211-1214 may be mounted to the frame 1200 in any suitable manner and be constructed of any suitable material, such as for example, low-rolling-resistance polyurethane. In alternate embodiments the bot 110 may have any suitable number of drive and idler wheels. In one exemplary embodiment, the wheels 1211-1214 may be substantially fixed relative to the a longitudinal axis 1470 (FIG. 4B) of the bot 110 (e.g. the rotational plane of the wheels is fixed in a substantially parallel orientation relative to the longitudinal axis 1470 of the bot) to allow the bot 110 to move in substantially straight lines such as when, for example, the bot is travelling on a transfer deck 130B (e.g. FIGS. 8-9B) or within a picking isle 130A (e.g. FIGS. 8-9B). In alternate embodiments, the rotational plane of one or more of the drive wheels and idler wheels may be pivotal (e.g. steerable) relative to the longitudinal axis 1470 of the bot for providing steering capabilities to the bot 110 by turning the rotational planes of one or more of the idler or drive wheels relative to the longitudinal axis 1470. The wheels 1211-1214 may be substantially rigidly mounted to the frame 1200 such that the axis of rotation of each wheel is substantially stationary relative to the frame 1200. In alternate embodiments the wheels 1211-1214 may be movably mounted to the frame by, for example, any suitable suspension device, such that the axis of rotation of the wheels 1211-1214 is movable relative to the frame 1200. Movably mounting the wheels 1211-1214 to the frame 1200 may allow the bot 110 to substantially level itself on uneven surfaces while keeping the wheels 1211-1214 in contact with the surface.

Each of the drive wheels 1211, 1212 may be individually driven by a respective motor 1211M, 1212M. The drive motors 1211M, 1212M may be any suitable motors such as, for exemplary purposes only, direct current electric motors. The motors 1211M, 1212M may be powered by any suitable power source such as by, for example, a capacitor 1400 (FIG. 4B) mounted to the frame 1200. In alternate embodiments the power source may be any suitable power source such as, for example, a battery or fuel cell. In still other alternate embodiments the motors may be alternating current electric motors or internal combustion motors. In yet another alternate embodiment, the motors may be a single motor with dual independently operable drive trains/transmissions for independently driving each drive wheel. The drive motors 1211M, 1212M may be configured for bi-directional operation and may be individually operable under, for example, control of the control system 1220 for effecting steering of the bot 110 as will be described below. The motors 1211M, 1212M may be configured for driving the bot 110 at any suitable speed with any suitable acceleration when the bot is in either a forward orientation (e.g. drive end 1298 trailing the direction of travel) or a reverse orientation (e.g. drive end 1298 leading the direction of travel). In this exemplary embodiment, the motors 1211M, 1212M are configured for direct driving of their respective drive wheel 1211, 1212. In alternate embodiments, the motors 1211M, 1212M may be indirectly coupled to their respective wheels 1211, 1212 through any suitable transmission such as, for example, a drive shaft, belts and pulleys and/or a gearbox. The drive system 1210 of the bot 110 may include an electrical braking system such as for example, a regenerative braking system (e.g. to charge, for example, a capacitor 1400 (FIG. 4B) powering the bot 110 under braking). In alternate embodiments, the bot 110 may include any suitable mechanical braking system. The drive motors may be configured to provide any suitable acceleration/deceleration rates and any suitable bot travel speeds. For exemplary purposes only the motors 1211M, 1212M may be configured to provide the bot (while the bot is loaded at full capacity) a rate of acceleration/deceleration of about 3.048 m/sec$^2$, a transfer deck 130B cornering speed of about 1.524 m/sec and a transfer deck straightaway speed of about 9.144 m/sec or about 10 m/sec.

Figure 8:
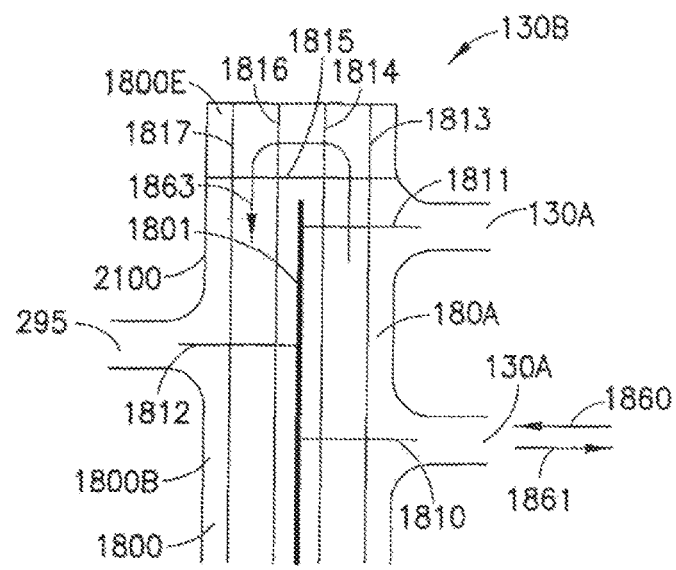
FIGS. 8, 9A and 9B schematically illustrate exemplary operational paths of a transport robot in accordance with the exemplary embodiments.
Figures 9A, 9B:
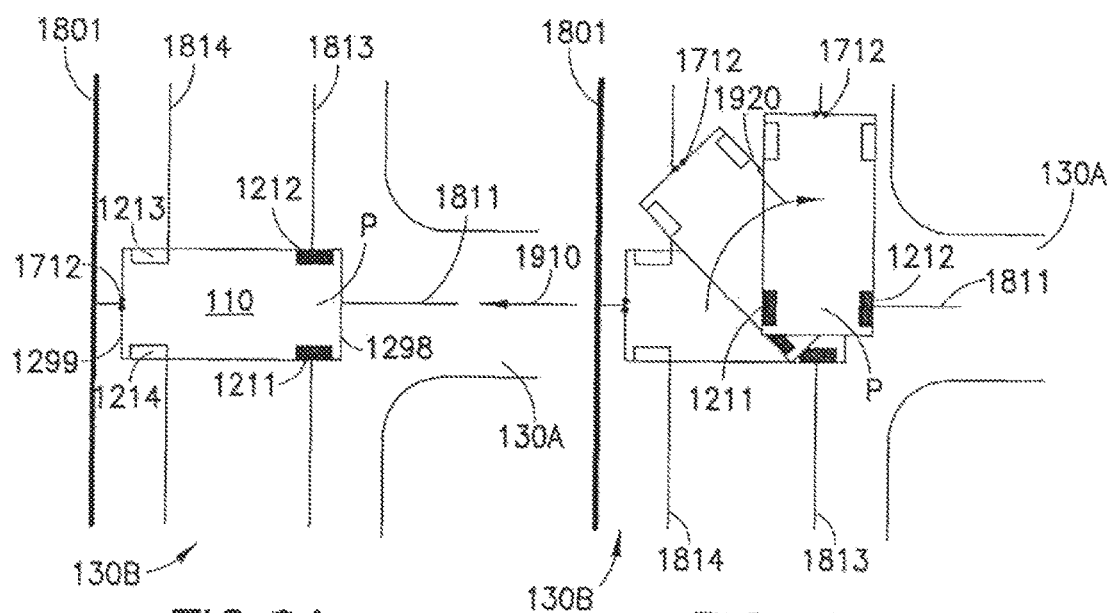

As noted above drive wheels 1211, 1212 and idler wheels 1213, 1214 are substantially fixed relative to the frame 1200 for guiding the bot 110 along substantially straight paths while the bot is travelling on, for example, the transfer decks 130B (e.g. FIGS. 8-9B). Corrections in the straight line paths may be made through differential rotation of the drive wheels 1211, 1212 as described herein. In alternate embodiments, guide rollers 1250, 1251 may be mounted to the frame to aid in guiding the bot 110 on the transfer deck 130B such as through contact with a wall 1801, 2100 (FIG. 8) of the transfer deck 130B. However, in this exemplary embodiment the fixed drive and idler wheels 1211-1214 may not provide agile steering of the bot 110 such as when, for example, the bot 110 is transitioning between the picking aisles 130A, transfer decks 130B or transfer areas 295

(FIGS. 8 and 11A-11E). In one exemplary embodiment, the bot 110 may be provided with one or more retractable casters 1260, 1261 for allowing the bot 110 to make, for example, substantially right angle turns when transitioning between the picking aisles 130A, transfer decks 130B and bot transfer stations 140A, 140B. It is noted that while two casters 1260, 1261 are shown and described, in alternate embodiments the bot 110 may have more or less than two retractable casters. The retractable casters 1260, 1261 may be mounted to the frame 1200 in any suitable manner such that when the casters 1260, 1261 are in a retracted position both the idler wheels 1213, 1214 and drive wheels 1211, 1212 are in contact with a flooring surface such as surface 1300S of the rails 1300 or a transfer deck 130B of the storage structure 130, whereas when the casters 1260, 1261 are lowered the idler wheels 1213, 1214 are lifted off the flooring surface. As the casters 1260, 1261 are extended or lowered the idler wheels 1213, 1214 are lifted off of the flooring surface so that the driven end 1299 of the bot 110 can be pivoted about a point P (FIG. 14B) of the bot through, for example, differential rotation of the drive wheels 1211, 1212. For example, the motors 1211M, 1212M may be individually and differentially operated for causing the bot 110 to pivot about point P which is located, for example, midway between the wheels 1211, 1212 while the driven end 1299 of the bot swings about point P accordingly via the casters 1260, 1261.

In other exemplary embodiments, the idler wheels 1213, 1214 may be replaced by non-retractable casters 1260', 1261' (FIG. 4C) where the straight line motion of the bot 110 is controlled by differing rotational speeds of each of the drive wheels 1211, 1212 as described herein. The non-retractable casters 1260', 1261' may be releasably lockable casters such that the casters 1260', 1261' may be selectively locked in predetermined rotational orientations to, for example, assist in guiding the bot 110 along a travel path. For example, during straight line motion of the bot 110 on the transfer deck 130B and/or within the picking aisles 130A the non-retractable casters 1260', 1261' may be locked in an orientation such that the wheels of the casters 1260', 1261' are substantially in-line with a respective one of the drive wheels 1213, 1214 (e.g. the rotational plane of the wheels of the casters is fixed in a substantially parallel orientation relative to the longitudinal axis 1470 of the bot). The rotational plane of the wheels of non-retractable casters 1260', 1261' may be locked and released relative to the longitudinal axis 1470 of the bot 110 in any suitable manner. For example, a controller 1701 (FIG. 7) of the bot 110 may be configured to effect the locking and releasing of the casters 1260', 1261' by for example controlling any suitable actuator and/or locking mechanism. In alternate embodiments any other suitable controller disposed on or remotely from the bot 110 may be configured to effect the locking and releasing of the casters 1260', 1261'.

Figure 3A:
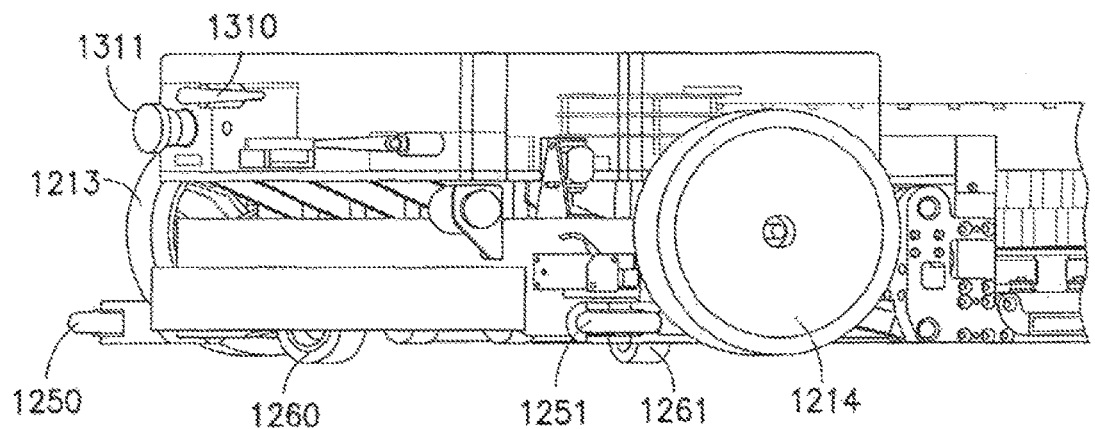
Figure 3B:
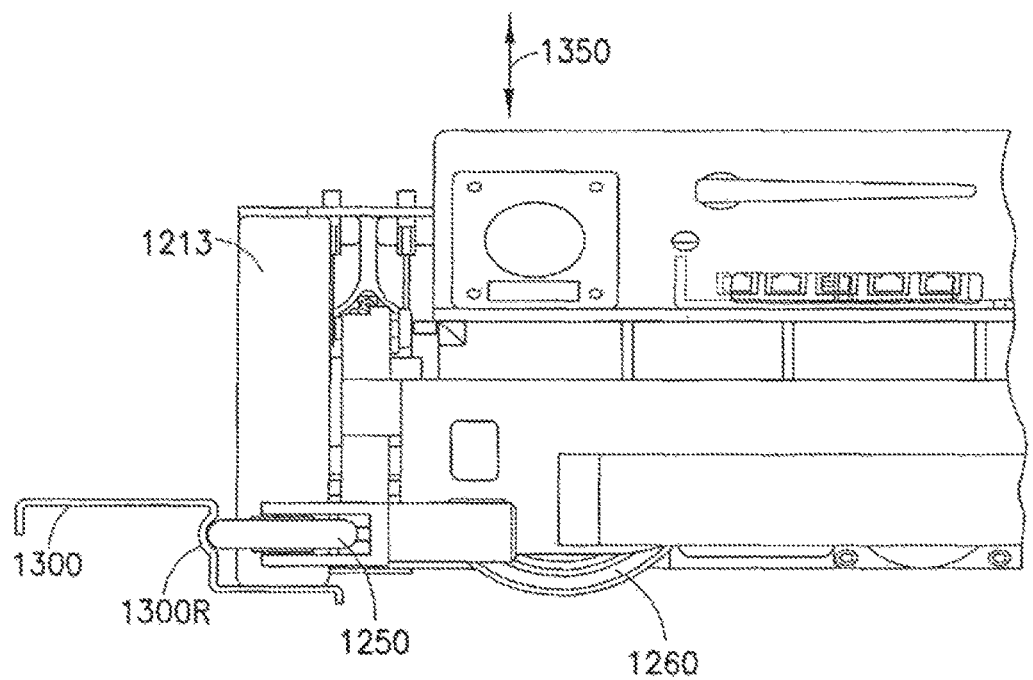
Figure 3C:
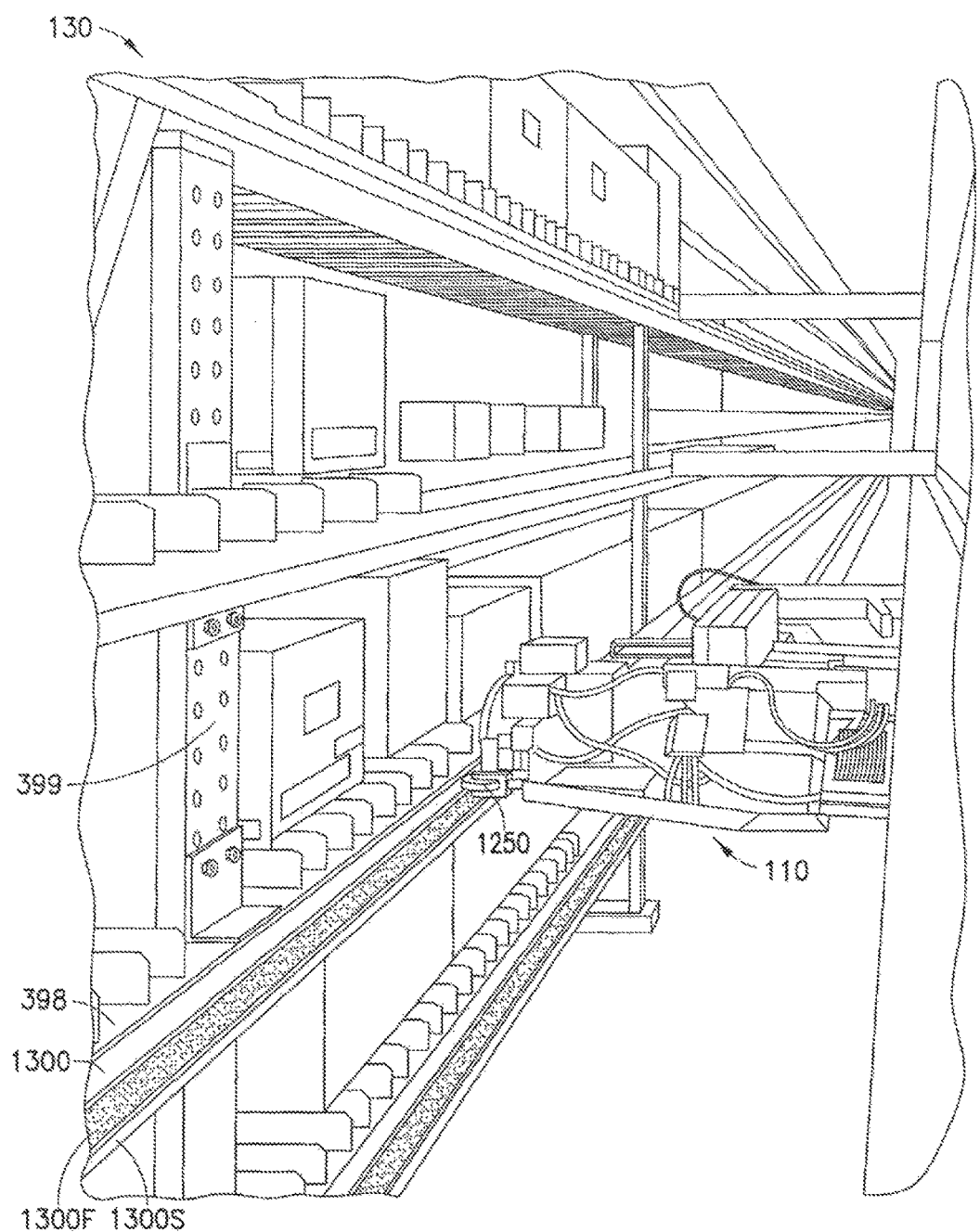

The bot 110 may also be provided with guide wheels 1250-1253. As can be best seen in FIGS. 3B and 3C, while the bot 110 is travelling in, for example, the picking aisles 130A and/or transfer areas 295 (FIGS. 8 and 11A-11E) the movement of the bot 110 may be guided by a tracked or rail guidance system. It is noted that the transfer areas 295 may allow the bots 110 to access transport shelves 730 of the multilevel vertical conveyors 150A, 150B. The rail guidance system may include rails 1300 disposed on either side of the bot 110. The rails 1300 and guide wheels 1250-1253 may allow for high-speed travel of the bot 110 without complex steering and navigation control subsystems. The rails 1300 may be configured with a recessed portion 1300R shaped to receive the guide wheels 1250-1253 of the bot 110. In alternate embodiments the rails may have any suitable configuration such as, for example, without recessed portion 1300R. The rails 1300 may be integrally formed with or otherwise fixed to, for example, one or more of the horizontal and vertical supports 398, 399 of the storage rack structure 130. As can be seen in FIG. 3C the picking aisles may be substantially floor-less such that bot wheel supports 1300S of the guide rails 1300 extend away from the storage areas a predetermined distance to allow a sufficient surface area for the wheels 1211-1214 (or in the case of lockable casters, wheels 1260', 1261') of the bot 110 to ride along the rails 1300. In alternate embodiments the picking aisles may have any suitable floor that extends between adjacent storage areas on either side of the picking aisle. In one exemplary embodiment, the rails 1300 may include a friction member 1300F for providing traction to the drive wheels 1211, 1212 of the bot 110. The friction member 1300F may be any suitable member such as for example, a coating, an adhesive backed strip or any other suitable member that substantially creates a friction surface for interacting with the wheels of the bot 110.

While four guide wheels 1250-1253 are shown and described it should be understood that in alternate embodiments the bot 110 may have any suitable number of guide wheels. The guide wheels 1250-1253 may be mounted to, for example, the frame 1200 of the bot in any suitable manner. In one exemplary embodiment, the guide wheels 1250-1253 may be mounted to the frame 1200, through for example, spring and damper devices so as to provide relative movement between the guide wheels 1250-1253 and the frame 1200. The relative movement between the guide wheels 1250-1253 and the frame may be a dampening movement configured to, for example, cushion the bot 110 and its payload against any change in direction or irregularities (e.g. misaligned joints between track segments, etc.) in the track 1300. In alternate embodiments, the guide wheels 1250-1253 may be rigidly mounted to the frame 1200. The fitment between the guide wheels 1250-1253 and the recessed portion 1300R of the track 1300 may be configured to provide stability (e.g. anti-tipping) to the bot during, for example, cornering and/or extension of the transfer arm 1235 (e.g. to counteract any tipping moments created by a cantilevered load on the transfer arm). In alternate embodiments the bot may be stabilized in any suitable manner during cornering and/or extension of the transfer arm 1235. For example, the bot 110 may include a suitable counterweight system for counteracting any moment that is created on the bot through the extension of the transfer arm 1235.

The transfer arm 1235 may be movably mounted to the frame 1200 within, for example, the payload area 1230. It is noted that the payload area 1230 and transfer arm 1235 may be suitably sized for transporting cases in the storage and retrieval system 100. For example, the width W of the payload area 1230 and transfer arm 1235 may be substantially the same as or larger than a depth D (FIG. 6B) of the storage shelves 600. In another example, the length L of the payload area 1230 and transfer arm 1235 may be substantially the same as or larger than the largest item length transferred through the system 100 with the item length being oriented along the longitudinal axis 1470 (FIG. 4B) of the bot 110.

Figure 4A:
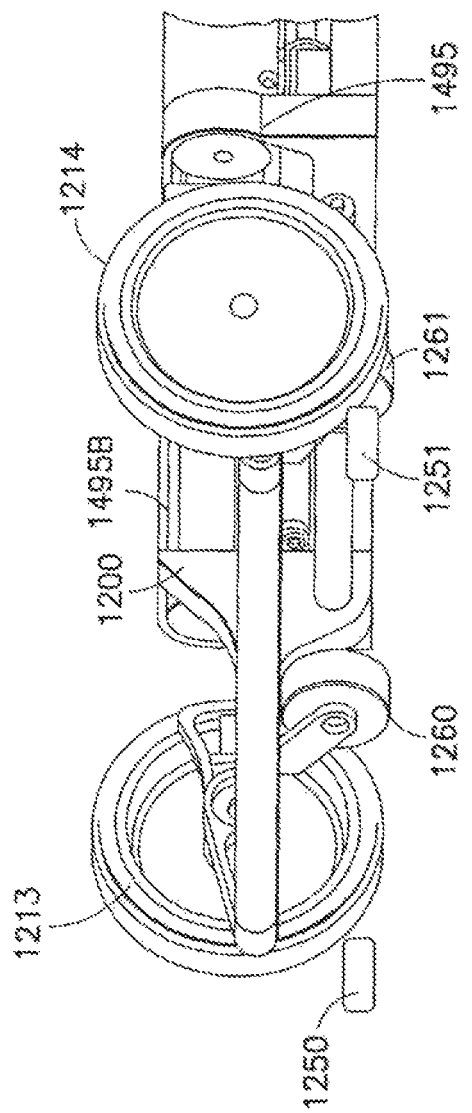
Figure 4C:
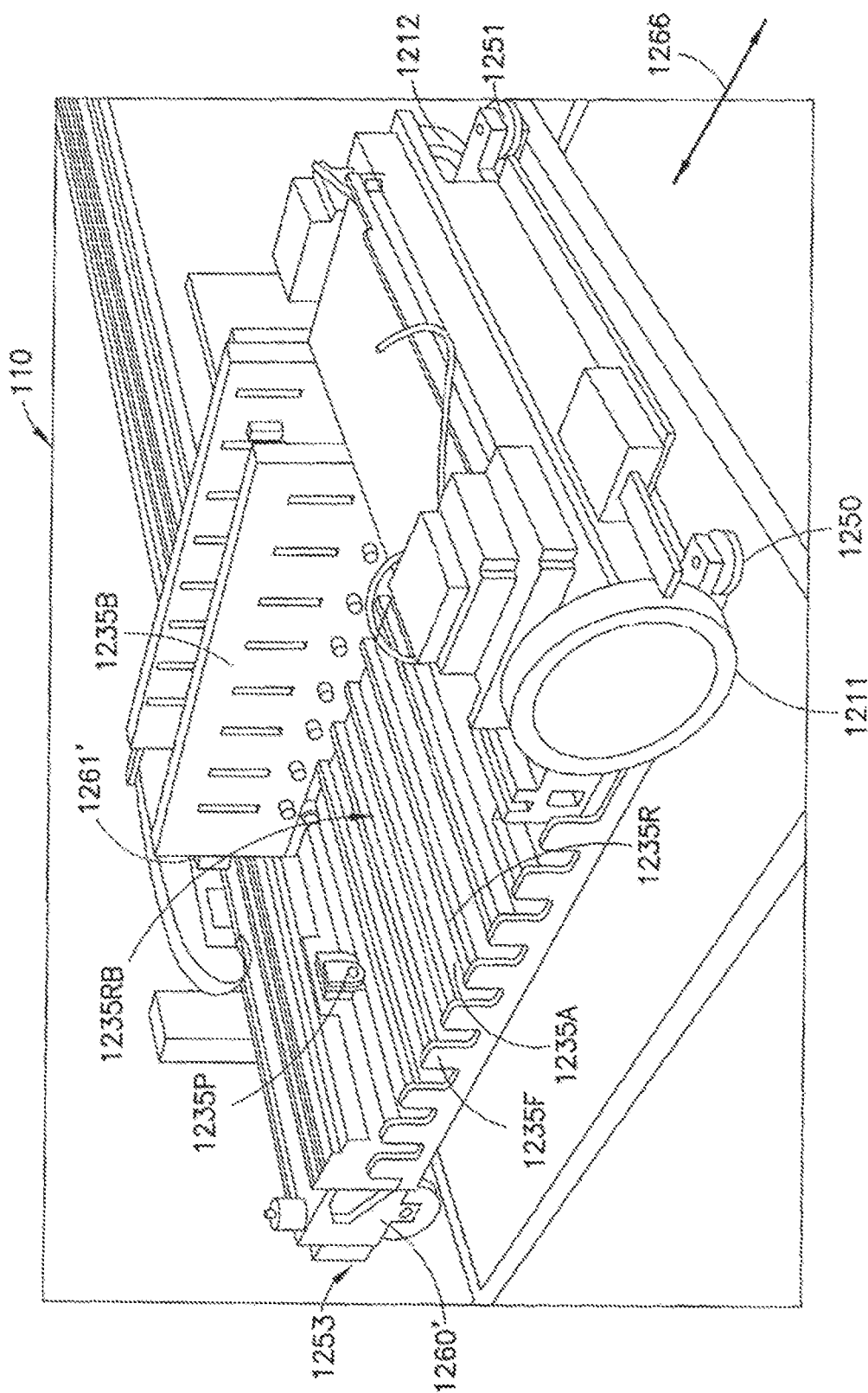
FIG. 4C illustrates a schematic view of a transport robot in accordance with an exemplary embodiment.

Referring also to FIGS. 4A and 4B, in this exemplary embodiment the transfer arm 1235 may include an array of fingers 1235A, one or more pusher bars 1235B and a fence 1235F. In alternate embodiments the transfer arm may have any suitable configuration and/or components. The transfer arm 1235 may be configured to extend and retract from the payload area 1230 for transferring loads to and from the bot 110. In one exemplary embodiment, the transfer arm 1235 may be configured to operate or extend in a unilateral manner relative to the longitudinal axis 1470 of the bot (e.g. extend from one side of the bot in direction 1471) for increasing, for example, reliability of the bot while decreasing the bots complexity and cost. It is noted that where the transfer arm 1235 is operable only to one side of the bot 110, the bot may be configured to orient itself for entering the picking aisles 130A and/or transfer areas 295 with either the drive end 1298 or the driven end 1299 facing the direction of travel so that the operable side of the bot is facing the desired location for depositing or picking a load. In alternate embodiments the bot 110 may be configured such that the transfer arm 1235 is operable or extendable in a bilateral manner relative to the longitudinal axis 1470 of the bot (e.g. extendable from both sides of the bot in directions 1471 and 1472).

In one exemplary embodiment, the fingers 1235A of the transfer arm 1235 may be configured such that the fingers 1235A are extendable and retractable individually or in one or more groups. For example, each finger may include a locking mechanism 1410 that selectively engages each finger 1235A to, for example, the frame 1200 of the bot 110 or a movable member of the transfer arm 1235 such as the pusher bar 1235B. The pusher bar 1235B (and any fingers coupled to the pusher bar), for example, may be driven by any suitable drive such as extension motor 1495. The extension motor 1495 may be connected to, for example, the pusher bar, through any suitable transmission such as, for exemplary purposes only, a belt and pulley system 1495B (FIG. 4A).

In one exemplary embodiment, the locking mechanism for coupling the fingers 1235A to, for example, the pusher bar 1235B may be, for example, a cam shaft driven by motor 1490 that is configured to cause engagement/disengagement of each finger with either the pusher bar or frame. In alternate embodiments, the locking mechanism may include individual devices, such as solenoid latches associated with corresponding ones of the fingers 1235A. It is noted that the pusher bar may include a drive for moving the pusher bar in the direction of arrows 1471, 1472 for effecting, for example, a change in orientation (e.g. alignment) of a load being carried by the bot 110, gripping a load being carried by the bot 110 or for any other suitable purpose. In one exemplary embodiment, when one or more locking mechanisms 1410 are engaged with, for example, the pusher bar 1235B the respective fingers 1235A extend and retract in the direction of arrows 1471, 1472 substantially in unison with movement of the pusher bar 1235B while the fingers 1235A whose locking mechanisms 1410 are engaged with, for example, the frame 1200 remain substantially stationary relative to the frame 1200.

In another exemplary embodiment, the transfer arm 1235 may include a drive bar 1235D or other suitable drive member. The drive bar 1235D may be configured so that it does not directly contact a load carried on the bot 110. The drive bar 1235D may be driven by a suitable drive so that the drive bar 1235D travels in the direction of arrows 1471, 1472 in a manner substantially similar to that described above with respect to the pusher bar 1235B. In this exemplary embodiment, the locking mechanisms 1410 may be configured to latch on to the drive bar 1235D so that the respective fingers 1235A may be extended and retracted independent of the pusher bar and vice versa. In alternate embodiments the pusher bar 1235B may include a locking mechanism substantially similar to locking mechanism 1410 for selectively locking the pusher bar to either the drive bar 1235D or the frame 1200 where the drive bar is configured to cause movement of the pusher bar 1235B when the pusher bar 1235B is engaged with the drive bar 1235D.

In one exemplary embodiment, the pusher bar 1235B may be a one-piece bar that spans across all of the fingers 1235A. In other exemplary embodiments, the pusher bar 1235B may be a segmented bar having any suitable number of segments 1235B1, 1235B2. Each segment 1235B1, 1235B2 may correspond to the groups of one or more fingers 1235A such that only the portion of the pusher bar 1235B corresponding to the finger(s) 1235A that are to be extended/retracted is moved in the direction of arrows 1471, 1472 while the remaining segments of the pusher bar 1235B remain stationary so as to avoid movement of a load located on the stationary fingers 1235A.

The fingers 1235A of the transfer arm 1235 may be spaced apart from each other by a predetermined distance so that the fingers 1235A are configured to pass through or between corresponding support legs 620L1, 620L2 of the storage shelves 600 (FIG. 5A) and corresponding support fingers 910 of the shelves 730 on the multilevel vertical conveyors 150A, 150B. In alternate embodiments the fingers 1235A may be configured to pass through corresponding support fingers of bot transfer stations for passing the bot load to multilevel vertical conveyor through the bot transfer station. The spacing between the fingers 1235A and a length of the fingers of the transfer arm 1235 allows an entire length and width of the loads being transferred to and from the bot 110 to be supported by the transfer arm 1235.

The transfer arm 1235 may include any suitable lifting device(s) 1235L configured to move the transfer arm 1235 in a direction 1350 (FIG. 13B) substantially perpendicular to a plane of extension/retraction of the transfer arm 1235.

Figure 5A:
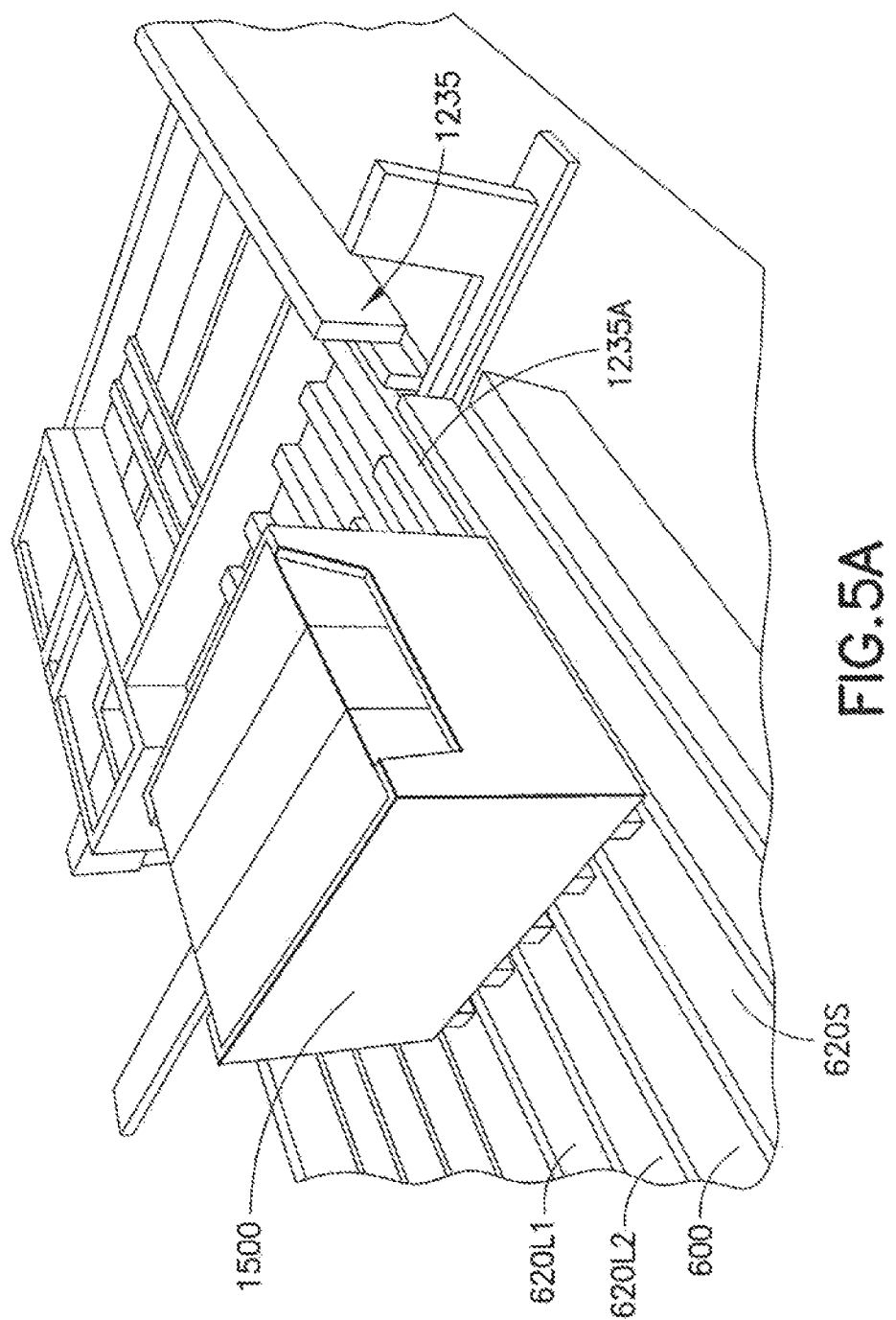

Referring also to FIGS. 5A-5C, in one example, a load (substantially similar to loads 750-753) is acquired from, for example, a storage shelf 600 by extending the fingers 1235A of the transfer arm 1235 into the spaces 620S between support legs 620L1, 620L2 of the storage shelf 600 and under one or more target items 1500 located on the shelf 600. The transfer arm lift device 1235L is suitably configured to lift the transfer arm 1235 for lifting the one or more target items 1500 off of the shelf 600. The fingers 1235A are retracted so that the one or more target items are disposed over the payload area 1230 of the bot 110. The lift device 1235L lowers the transfer arm 1235 so the one or more target items are lowered into the payload area 1230 of the bot 110. In alternate embodiments, the storage shelves 600 may be configured with a lift motor for raising and lowering the target items where the transfer arm 1235 of the bot 110 does not include a lift device 1235L. FIG. 5B illustrates an extension of three of the fingers 1235A for transferring a load 1501. FIG. 5C shows a shelf 1550 having two items or loads 1502, 1503 located side by side. In FIG. 5C, three fingers 1235A of the transfer arm 1235 are extended for acquiring only load 1502 from the shelf 1550. As can be seen in FIG. 5C, it is noted that the loads carried by the bots 110 may include cases of individual items (e.g. load 1502 includes two separate boxes and load 1503 includes three separate boxes). It is also noted that in one exemplary embodiment the extension of the transfer arm 1235 may be controlled for retrieving a predetermined number of items from an array of items. For example, the fingers 1235A in FIG. 5C may be extended so that only item 1502A is retrieved while item 1502B remains on the shelf 1550. In another example, the fingers 1235A may be extended only part way into a shelf 600 (e.g. an amount less than the depth D of the shelf 600) so that a first item located at, for example, the front of the shelf (e.g. adjacent the picking aisle) is picked while a second item located at the back of the shelf, behind the first item, remains on the shelf.

Figure 6B:
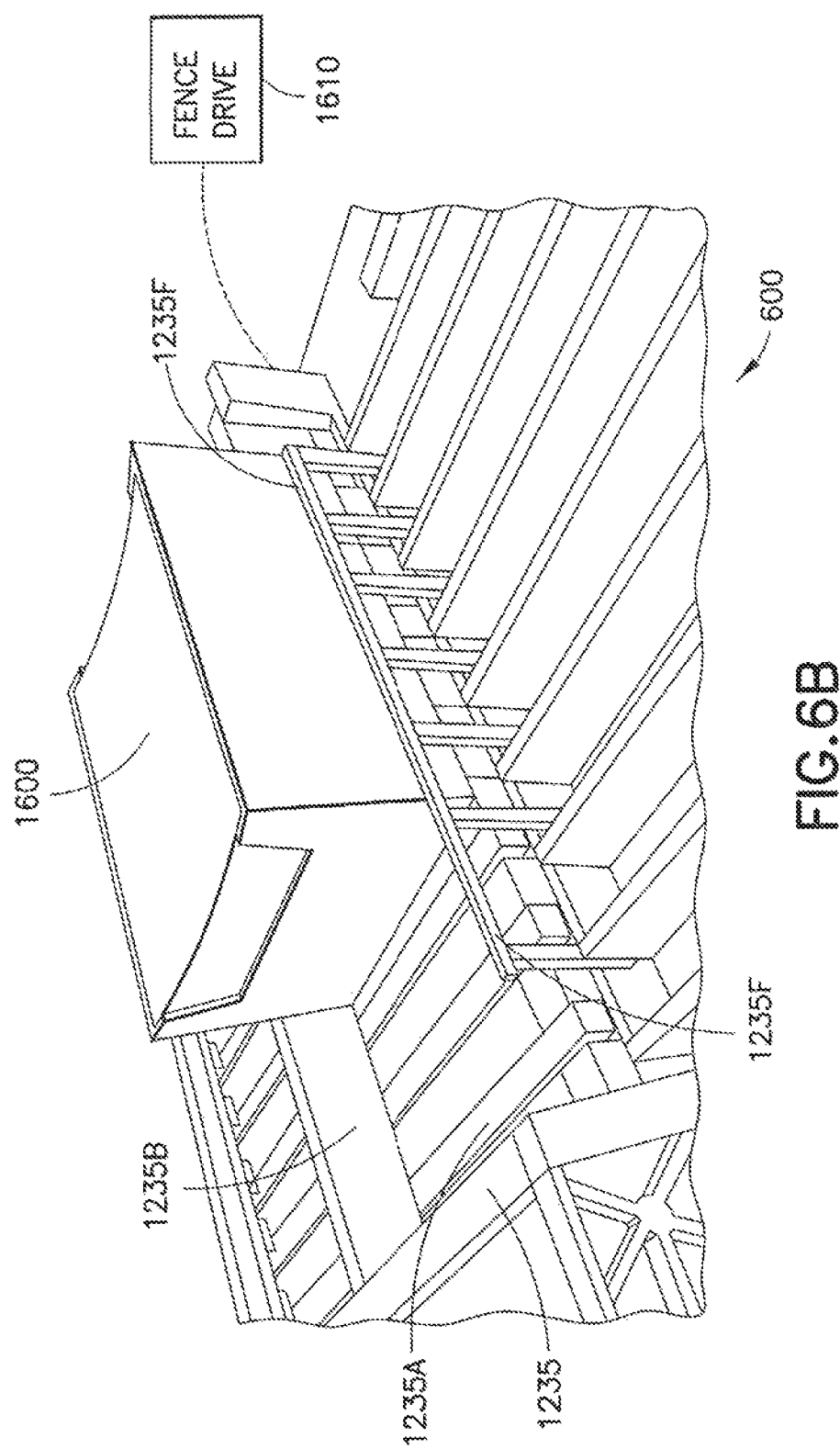
Figure 6C:
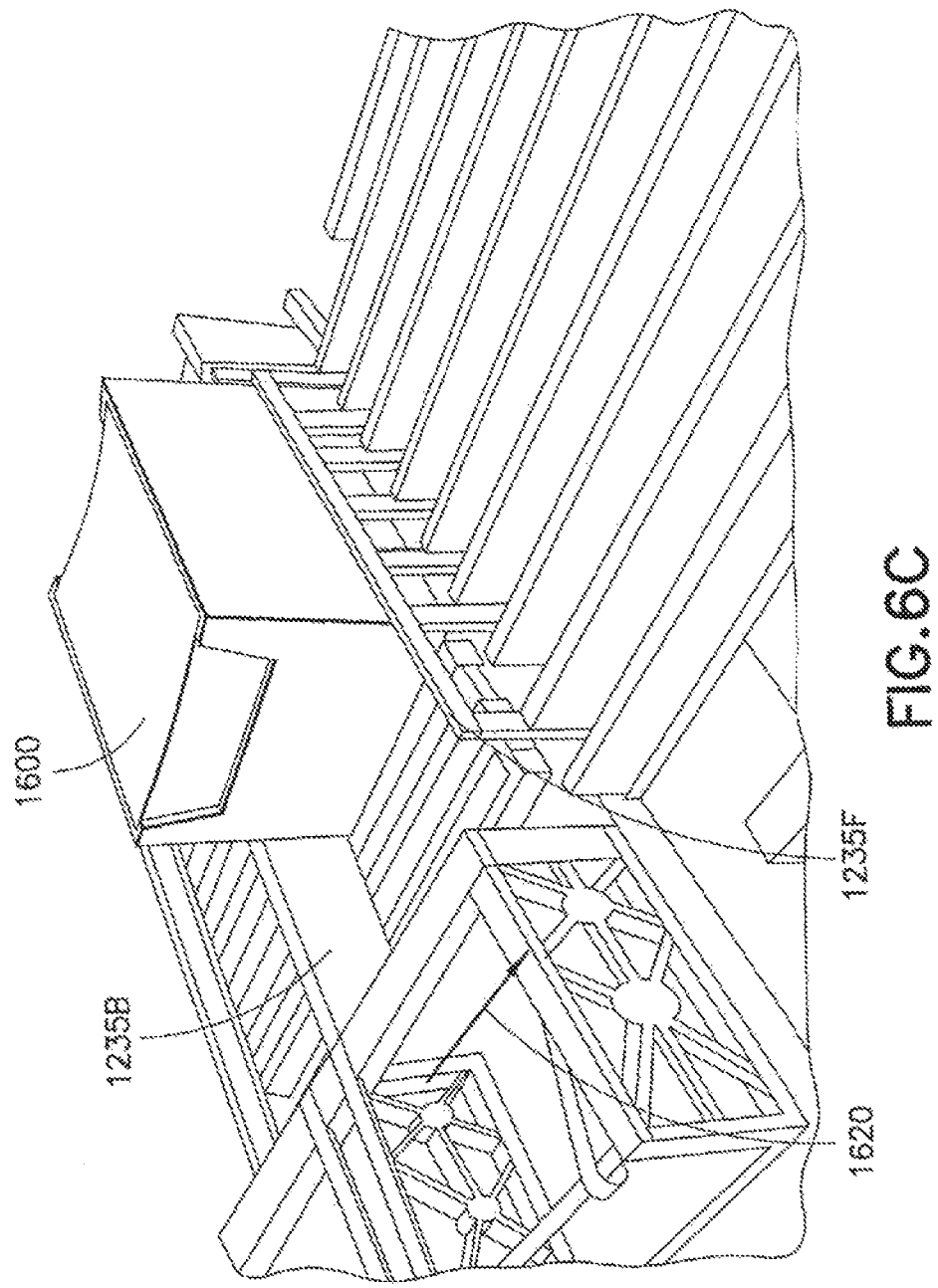

As noted above the bot 110 may include a retractable fence 1235F. Referring to FIGS. 6A-6D, the fence 1235F may be movably mounted to the frame 1200 of the bot 110 in any suitable manner so that the loads, such as load 1600, pass over the retracted fence 1235F as the loads are transferred to and from the bot payload area 1230 as can be seen in FIG. 6A. Once the load 1600 is located in the payload area 1230, the fence 1235F may be raised or extended by any suitable drive motor 1610 so that the fence 1235F extends above the fingers 1235A of the bot 110 for substantially preventing the load 1600 from moving out of the payload area 1230 as can be seen in FIG. 6B. The bot 110 may be configured to grip the load 1600 to, for example, secure the load during transport. For example, the pusher bar 1235B may move in the direction of arrow 1620 towards the fence 1235F such that the load 1600 is sandwiched or gripped between the pusher bar 1235B and the fence 1235F as can be seen in FIGS. 6C and 6D. As may be realized, the bot 110 may include suitable sensors for detecting a pressure exerted on the load 1600 by the pusher bar 1235B and/or fence 1235F so as to prevent damaging the load 1600. In alternate embodiments, the load 1600 may be gripped by the bot 110 in any suitable manner.

Referring again to FIGS. 4B and 4C, the bot 110 may include a roller bed 1235RB disposed in the payload area 1230. The roller bed 1235RB may include one or more rollers 1235R disposed transversely to the longitudinal axis 1470 of the bot 110. The rollers 1235R may be disposed within the payload area 1230 such that the rollers 1235R and the fingers 1235A are alternately located so that the fingers 1235A may pass between the rollers 1235R for transferring items to and from the payload area 1230 as described above. One or more pushers 1235P may be disposed in the payload area 1230 such that a contact member of the one or more pushers 1235P extends and retracts in a direction substantially perpendicular to the axis of rotation of the rollers 1235R. The one or more pushers 1235P may be configured to push the load 1600 back and forth within the payload area 1230 in the direction of arrow 1266 (e.g. substantially parallel to the longitudinal axis 1470 of the bot 110) along the rollers 1235R for adjusting a position of the load 1600 longitudinally within the payload area 1230. In alternate embodiments, the rollers 1235R may be driven rollers such that a controller of, for example, the bot drives the rollers for moving the load 1600 such that the load is positioned at a predetermined location within the payload area 1230. In still other alternate embodiments the load may be moved to the predetermined location within the payload area in any suitable manner. The longitudinal adjustment of the load 1600 within the payload area 1230 may allow for positioning of the loads 1600 for transferring the loads from the payload area to, for example, a storage location or other suitable location such as the multilevel vertical conveyors 150A, 150B or bot transfer stations 140A, 140B.

Figure 7:
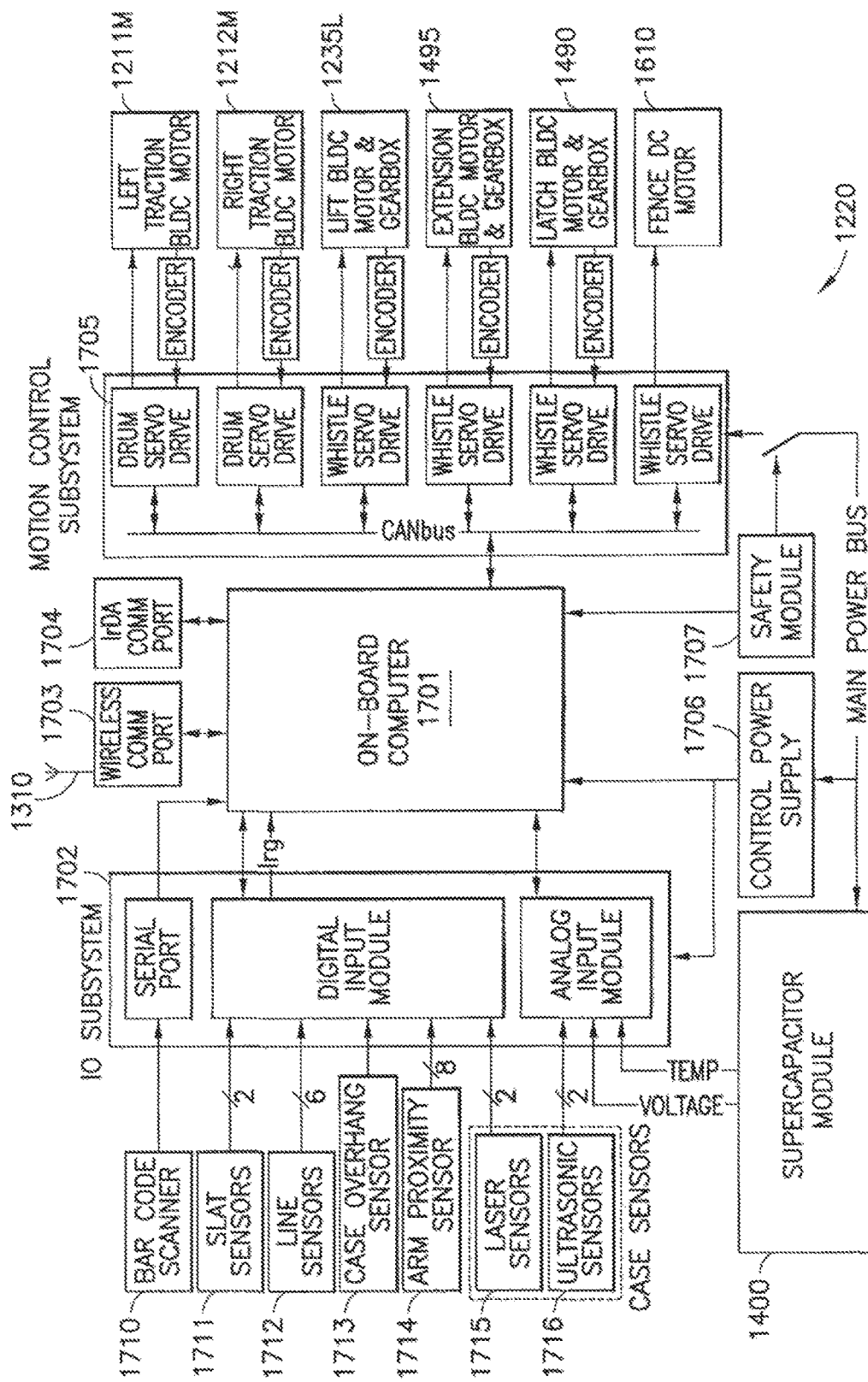
FIG. 7 schematically illustrates a control system of the transport robot of FIGS. 2, 3A and 3B in accordance with an exemplary embodiment.

Referring now to FIG. 7, the control system 1220 of the bot will be described. The control system 1220 may be configured to provide communications, supervisory control, bot localization, bot navigation and motion control, case sensing, case transfer and bot power management. In alternate embodiments the control system 1220 may be configured to provide any suitable services to the bot 110. The control system 1220 may include any suitable programs or firmware configured for performing the bot operations described herein. The control system 1220 may be configured to allow for remote (e.g. over a network) debugging of the bot. In one example, the firmware of the bot may support a firmware version number that can be communicated over, for example, the network 180 so the firmware may be suitably updated. The control system 1220 may allow for assigning a unique bot identification number to a respective bot 110 where the identification number is communicated over the network 180 (FIG. 1) to, for example, track a status, position or any other suitable information pertaining to the bot 110. In one example, the bot identification number may be stored in a location of the control system 1220 such that the bot identification number is persistent across a power failure but is also changeable.

In one exemplary embodiment, the control system 1220 may be divided into a front end 1220F (FIG. 2) and back end 1220B (FIG. 2) having any suitable subsystems 1702, 1705. The control system 1220 may include an on-board computer 1701 having, for example, a processor, volatile and non-volatile memory, communication ports and hardware interface ports for communicating with the on-board control subsystems 1702, 1705. The subsystems may include a motion control subsystem 1705 and an input/output subsystem 1702. In alternate embodiments, the bot control system 1220 may include any suitable number of portions/subsystems.

The front end 1220F may be configured for any suitable communications (e.g. synchronous or asynchronous communications regarding bot commands, status reports, etc.) with the control server 120. The communications between the bot 110 and the control server 120 may, in one exemplary embodiment, provide for a substantially automatic bootstrap from, for example, initial installation of the bot 110, operational failure of the bot 110 and/or bot replacement. For example, when a bot 110 is initialized, the bot may obtain an identification number and subscribe to a bot proxy 2680 (FIG. 26A) via communication with the front end 1220F. This allows the bot to become available for receiving tasks. The front end 1220F may receive and decompose tasks assigned to the bot 110 and reduce the task into primitives (e.g. individual commands) that the back end 1220B can understand. In one example, the front end 1220F may consult any suitable resources such as, for example, a map of the storage structure 130 (FIG. 1) to decompose a task into the primitives and to determine the various movement related parameters (e.g. velocity, acceleration, deceleration, etc.) for each portion of the task. The front end 1220F may pass the primitives and movement related parameters to the back end 1220B for execution by the bot 110. The bot front end 1220F may be configured as a pair of state machines where a first one of the state machines handles communication between the front end 1220F and the control server 120 and a second one of the state machines handles communication between the front end 1220F and the back end 1220B. In alternate embodiments the front end 1220F may have any suitable configuration. The first and second state machines may interact with each other by generating events for each other. The state machines may include a timer for handling timeouts such as during, transfer deck 130B access. In one example, when a bot 110 is entering a transfer deck 130B (e.g. FIG. 8), a bot proxy of the central system control computers may inform the front end 1220F of a predetermined entrance time that the bot is to enter the transfer deck 130B. The front end 1220F may start the timer of the state machines according to a time the bot is to wait (based on the predetermined entrance time) before entering the deck. It is noted that the timers (e.g. clocks) of the state machines and the bot proxy 2680 may be synchronized clocks so as to substantially avoid collisions between bots travelling on the transfer deck 130B and bots entering the transfer deck 130B.

The back end 1220B may be configured to effect the functions of the bot described above (e.g. lowering the casters, extending the fingers, driving the motors, etc.) based on, for example, the primitives received from the front end 1220F. In one example, the back end 122B may monitor and update bot parameters including, but not limited to, bot position and velocity and send those parameters to the bot front end 1220F. The front end 1220F may use the parameters (and/or any other suitable information) to track the bot's 110 movements and determine the progress of the bot task(s). The front end 1220F may send updates to, for example, the bot proxy 2680 so that the control server 120 can track the bot movements and task progress and/or any other suitable bot activities.

The motion control subsystem 1705 may be part of the back end 1220B and configured to effect operation of, for example, the drive motors 1211M, 1212M, 1235L, 1495, 1490, 1610 of the bot 110 as described herein. The motion control subsystem 1705 may be operatively connected to the computer 1701 for receiving control instructions for the operation of, for example, servo drives (or any other suitable motor controller) resident in the motion control subsystem 1705 and subsequently their respective drive motors 1211M, 1212M, 1235L, 1495, 1490, 1610. The motion control subsystem 1705 may also include suitable feedback devices, such as for example, encoders, for gathering information pertaining to the drive motor operation for monitoring, for example, movement the transfer arm 1235 and its components (e.g. when the fingers 1235A are latched to the pusher bar, a location of the pusher bar, extension of the fence, etc.) or the bot 110 itself. For example, an encoder for the drive motors 1211M, 1212M may provide wheel odometry information, and encoders for lift motor 1235L and extension motor 1495 may provide information pertaining to a height of the transfer arm 1235 and a distance of extension of the fingers 1235A. The motion control subsystem 1705 may be configured to communicate the drive motor information to the computer 1701 for any suitable purpose including but not limited to adjusting a power level provided to a motor.

The input/output subsystem 1702 may also be part of the back end 1220B and configured to provide an interface between the computer 1701 and one or more sensors 1710-1716 of the bot 110. The sensors may be configured to provide the bot with, for example, awareness of its environment and external objects, as well as the monitor and control of internal subsystems. For example, the sensors may provide guidance information, payload information or any other suitable information for use in operation of the bot 110. For exemplary purposes only, the sensors may include a bar code scanner 1710, slat sensors 1711, line sensors 1712, case overhang sensors 1713, arm proximity sensors 1714, laser sensors 1715 and ultrasonic sensors 1716.

The bar code scanner(s) 1710 may be mounted on the bot 110 in any suitable location. The bar code scanners(s) 1710 may be configured to provide an absolute location of the bot 110 within the storage structure 130. The bar code scanner(s) 1710 may be configured to verify aisle references and locations on the transfer decks by, for example, reading bar codes located on, for example the transfer decks, picking aisles and transfer station floors to verify a location of the bot 110. The bar code scanner(s) 1710 may also be configured to read bar codes located on items stored in the shelves 600.

The slat sensors 1711 may be mounted to the bot 110 at any suitable location. The slat sensors 1711 may be configured to count the slats or legs 620L1, 620L2 of the storage shelves 600 (e.g. FIG. 5A) for determining a location of the bot 110 with respect to the shelving of, for example, the picking aisles 130A. The slat information may be used by the computer 1701 to, for example, correct the bot's odometry and allow the bot 110 to stop with its fingers 1235A positioned for insertion into the spaces between the legs 620L1, 620L2. In one exemplary embodiment, the bot may include slat sensors 1711 on the drive end 1298 and the driven end 1299 of the bot to allow for slat counting regardless of which end of the bot is facing the direction the bot is travelling. The slat sensors 1711 may be any suitable sensors such as, for example, close range triangulation or "background suppression" sensors. The slat sensors 1711 may be oriented on the bot 110 so that the sensors see down into the slats and ignore, for example, the thin edges of the legs 620L1, 620L2. For exemplary purposes only, in one exemplary embodiment the slat sensors 1711 may be mounted at about a 15 degree angle from perpendicular (relative to the longitudinal axis 1470 (FIG. 4B) of the bot 110). In alternate embodiments the slat sensors 1711 may be mounted on the bot in any suitable manner.

The line sensors 1712 may be any suitable sensors mounted to the bot in any suitable location, such as for exemplary purposes only, on bumpers 1273 (FIG. 2) disposed on the drive and driven ends of the bot 110. For exemplary purposes only, the line sensors may be diffuse infrared sensors. The line sensors 1712 may be configured to detect guidance lines provided on, for example, the floor of the transfer decks 130B (e.g. FIG. 8). The bot 110 may be configured to follow the guidance lines when travelling on the transfer decks 130B and defining ends of turns when the bot is transitioning on or off the transfer decks 130B. The line sensors 1712 may also allow the bot 110 to detect index references for determining absolute localization where the index references are generated by crossed guidance lines. In this exemplary embodiment the bot 110 may have about six line sensors 1712 but in alternate embodiments the bot 110 may have any suitable number of line sensors.

The case overhang sensors 1713 may be any suitable sensors that are positioned on the bot to span the payload area 1230 adjacent the top surface of the fingers 1235A. The case overhang sensors 1713 may be disposed at the edge of the payload area 1230 to detect any loads that are at least partially extending outside of the payload area 1230. In one exemplary embodiment, the case overhang sensors 1713 may provide a signal to the computer 1701 (when there is no load or other items obstructing the sensor) indicating that the fence 1235F may be raised for securing the load(s) within the payload area 1230. In other exemplary embodiments, the case overhang sensors 1713 may also confirm a retraction of the fence 1235F before, for example, the fingers 1235A are extended and/or a height of the transfer arm 1235 is changed.

The arm proximity sensors 1714 may be mounted to the bot 110 in any suitable location, such as for example, on the transfer arm 1235. The arm proximity sensors 1714 may be configured to sense objects around the transfer arm 1235 and/or fingers 1235A of the transfer arm 1235 as the transfer arm 1235 is raised/lowered and/or as the fingers 1235A are extended/retracted. Sensing objects around the transfer arm 1235 may, for exemplary purposes only, substantially prevent collisions between the transfer arm 1235 and objects located on, for example, shelves 600 (e.g. FIG. 5A) or the horizontal and/or vertical supports of the storage structure 130.

The laser sensors 1715 and ultrasonic sensors 1716 (collectively referred to as case sensors) may be configured to allow the bot 110 to locate itself relative to each case unit forming the load carried by the bot 110 before the case units are picked from, for example, the storage shelves 600 and/or multilevel vertical conveyor (or any other location suitable for retrieving payload). The case sensors may also allow the bot to locate itself relative to empty storage locations for placing case units in those empty storage locations. This location of the bot relative to the case units to be picked and/or empty storage locations for placing the case units may be referred to as bot localization, which will be described in greater detail below. The case sensors may also allow the bot 110 to confirm that a storage slot (or other load depositing location) is empty before the payload carried by the bot is deposited in, for example, the storage slot. In one example, the laser sensor 1715 may be mounted to the bot at a suitable location for detecting edges of items to be transferred to (or from) the bot 110. The laser sensor 1715 may work in conjunction with, for example, retro-reflective tape (or other suitable reflective surface, coating or material) located at, for example, the back of the shelves 600 to enable the sensor to "see" all the way to the back of the storage shelves 600. The reflective tape located at the back of the storage shelves allows the laser sensor 1715 to be substantially unaffected by the color, reflectiveness, roundness or other suitable characteristics of the items located on the shelves 600. The ultrasonic sensor 1716 may be configured to measure a distance from the bot 110 to the first item in a predetermined storage area of the shelves 600 to allow the bot 110 to determine the picking depth (e.g. the distance the fingers 1235A travel into the shelves 600 for picking the item(s) off of the shelves 600). One or more of the case sensors may allow for detection of case orientation (e.g. skewing of cases within the storage shelves 600) by, for example, measuring the distance between the bot 110 and a front surface of the case units to be picked as the bot 110 comes to a stop adjacent the case units to be picked. The case sensors may allow verification of placement of a case unit on, for example, a storage shelf 600 by, for example, scanning the case unit after it is placed on the shelf.

It is noted that the computer 1701 and its subsystems 1702, 1705 may be connected to a power bus for obtaining power from, for example, the capacitor 1400 through any suitable power supply controller 1706. It is noted that the computer 1701 may be configured to monitor the voltage of the capacitor 1400 to determine its state of charge (e.g. its energy content). In one exemplary embodiment, the capacitor may be charged through charging stations located at, for example, one or more transfer areas 295 (FIGS. 8 and 11A-11E) or at any other suitable location of the storage structure 130 so that the bot is recharged when transferring payloads and remains in substantially continuous use. The charging stations may be configured to charge the capacitor 1400 within the time it takes to transfer the payload of the bot 110. For exemplary purposes only, charging of the capacitor 1400 may take about 15 seconds. In alternate embodiments, charging the capacitor may take more or less than about 15 seconds. During charging of the capacitor 1400 the voltage measurement may be used by the computer 1701 to determine when the capacitor is full and to terminate the charging process. The computer 1701 may be configured to monitor a temperature of the capacitor 1400 for detecting fault conditions of the capacitor 1400.

The computer 1701 may also be connected to a safety module 1707 which includes, for example, an emergency stop device 1311 (FIG. 3A) which when activated effects a disconnection of power to, for example, the motion control subsystem 1705 (or any other suitable subsystem(s) of the bot) for immobilizing or otherwise disabling the bot 110. It is noted that the computer 1701 may remain powered during and after activation of the emergency stop device 1311. The safety module 1707 may also be configured to monitor the servo drives of the motion control subsystem 1705 such that when a loss of communication between the computer and one or more of the servo drives is detected, the safety module 1707 causes the bot to be immobilized in any suitable manner. For example, upon detection of a loss of communication between the computer 1701 and one or more servo drives the safety module 1707 may set the velocity of the drive motors 1211M, 1212M to zero for stopping movement of the bot 110.

The communication ports of the control system 1220 may be configured for any suitable communications devices such as, for example, a wireless radio frequency communication device 1703 (including one or more antennae 1310) and any suitable optical communication device 1704 such as, for example, an infrared communication device. The wireless radio frequency communication device 1703 may be configured to allow communication between the bot 110 and, for example, the control server 120 and/or other different bots 110 over any suitable wireless protocol. For exemplary purposes only, the wireless protocol for communicating with the control server 120 may be the wireless 802.11 network protocol (or any other suitable wireless protocol). Communications within the bot control system 1220 may be through any suitable communication bus such as, for example, a control network area bus. It is noted that the control server 120 and the bot control system 1220 may be configured to anticipate momentary network communication disruptions. For example, the bot may be configured to maintain operation as long as, for example, the bot 110 can communicate with the control server 120 when the bot 110 transits a predetermined track segment and/or other suitable way point. The optical communication device 1704 may be configured to communicate with, for example, the bot transfer stations for allowing initiation and termination of charging the capacitor 1400. The bot 110 may be configured to communicate with other bots 110 in the storage and retrieval system 100 to form a peer-to-peer collision avoidance system so that bots can travel throughout the storage and retrieval system 100 at predetermined distances from each other in a manner substantially similar to that described in U.S. patent application Ser. No. 12/757,337, entitled "CONTROL SYSTEM FOR STORAGE AND RETRIEVAL SYSTEMS,", previously incorporated by reference herein in its entirety.

Referring to FIGS. 2, 4B and 8-13B, bot navigation and motion control will be described. Generally, in accordance with the exemplary embodiments, the bot 110 has, for example, three modes of travel. In alternate embodiments the bot 110 may have more than three modes of travel. For exemplary purposes only, in the picking aisles 130A the bot travels on wheels 1211-1214 (or lockable casters 1260', 1261' in lieu of idler wheels 1213, 1214) and is guided by guide wheels 1250-1253 against the sides of track 1300 (FIG. 3B). On the transfer deck 130B, the bot 110 uses casters 1261, 1262 (or releases lockable casters 1260', 1261') while making substantially right angle turns when transitioning from/to the picking aisles 130A or transfer stations 140A, 140B. For traveling long distances on, for example, the transfer deck 130B the bot 110 travels on wheels 1211-1214 (or lockable casters 1260', 1261' in lieu of idler wheels 1213, 1214 where the casters 1260', 1261' are rotationally locked as described above) using a "skid steering" algorithm (e.g. slowing down or stopping rotation of one drive wheel relative to the other drive wheel to induce a turning motion on the bot) to follow guidance lines 1813-1817 on the transfer deck 130B.

When traveling in the picking aisles 130A, the bot 110 travels in substantially straight lines. These substantially straight line moves within the picking aisles 130A can be in either direction 1860, 1861 and with either bot orientation (e.g. a forward orientation with the drive end 1298 trailing the direction of travel and a reverse orientation with the drive end 1298 leading the direction of travel). During straight line motion on the transfer deck 130B the bot 110 travels in, for exemplary purposes only, a counterclockwise direction 1863, with a forward bot orientation. In alternate embodiments the bot may travel in any suitable direction with any suitable bot orientation. In still other alternate embodiments, there may be multiple travel lanes allowing bots to travel in multiple directions (e.g. one travel lane has a clockwise direction of travel and another travel lane has a counter-clockwise direction of travel). In one example, the turns to and from the picking aisles 130A and/or transfer areas 295 are about 90 degrees where the center point of rotation P of the bot is located substantially midway between the drive wheels 1211, 1212 such that the bot can rotate clockwise or counterclockwise. In alternate embodiments the bot turns may be more or less than about 90 degrees. In another example, the bot may make a substantially 180 degree turn (i.e. two substantially 90 degree turns made in sequence without a stop) as will be described below.

As described above, the transfer deck 130B may include guidance lines 1810-1817 for guiding the bot 110. The guidance lines 1810-1817 may be any suitable lines adhered to, formed in or otherwise affixed to the transfer deck 130B. For exemplary purposes only, in one example the guidance lines may be a tape affixed to the surface of the transfer deck 130B. In this exemplary embodiment the transfer deck 130B includes a track 1800 having a first side 1800A and a second side 1800B separated by a wall 1801. The first and second sides 1800A, 1800B of the track 1800 are joined by end track sections 1800E (only one of which is shown in FIG. 8). In alternate embodiments the track 1800 may have any suitable configuration. Each of the first and second sides 1800A, 1800B includes two travel lanes defined by, for example, guidance lines 1813, 1814 and 1816, 1817 respectively. The end track portions 1800E include, for example, one travel lane defined by, for example, guidance line 1815. In alternate embodiments the sections/sides of the track 1800 may have any suitable number of travel lanes defined in any suitable manner. In accordance with the exemplary embodiments each picking lane 130A and/or transfer area 295, includes a lead in/out guidance line 1810-1812. The lead in/out guidance lines 1810-1812 and the single guidance line 1815 of the end track portions 1800E may be detected by the bot 110 as index marks for bot localization during long line-following moves. The lead in/out guidance lines 1810-1812 and guidance line 1815 may also be detected by the bot 110 as reference marks for making turns.

Figure 10:
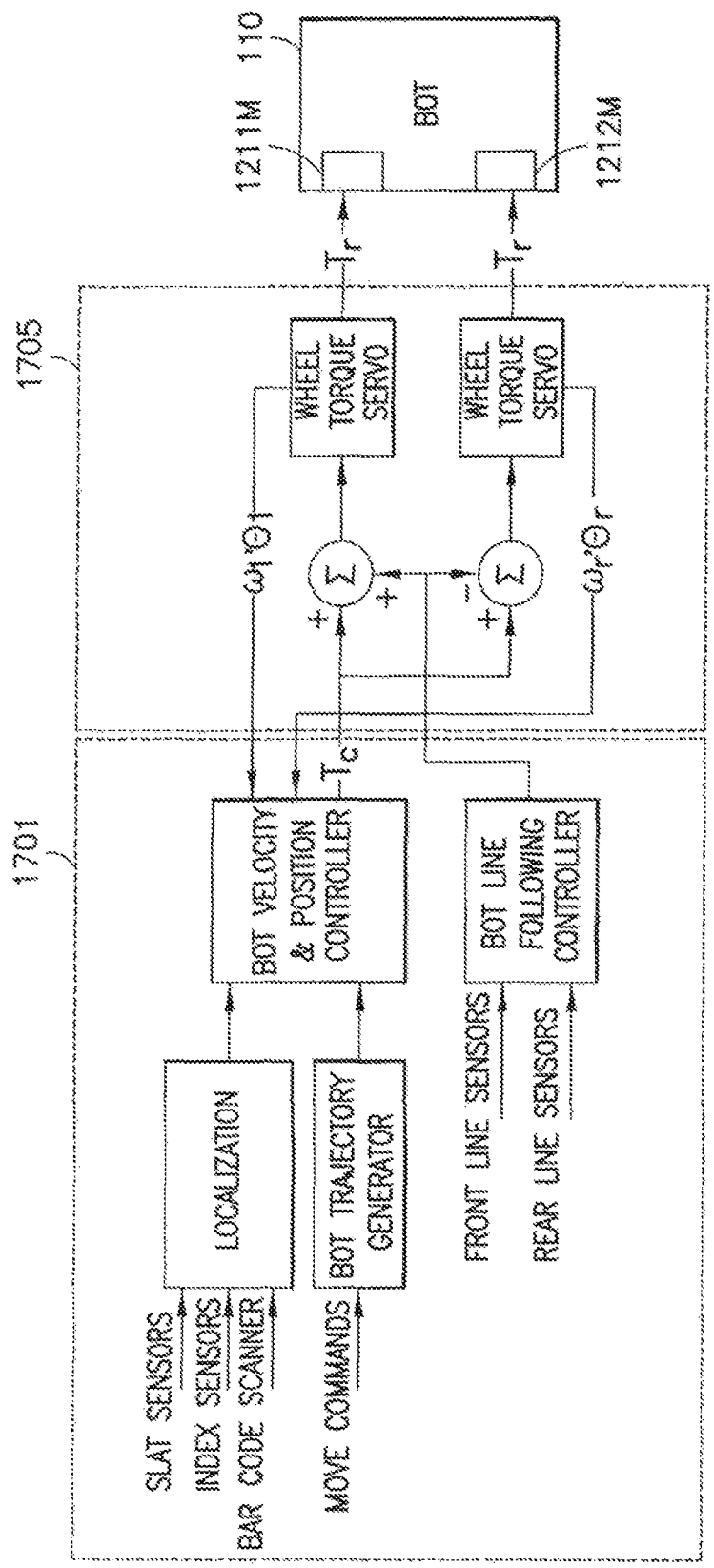
FIG. 10 schematically illustrates a portion of the control system of FIG. 17 in accordance with an exemplary embodiment.

When the bot 110 moves in substantially straight lines, such as in the picking aisles 130A and/or transfer areas 295, the drives for motors 1211M, 1212M may be configured as torque controllers. For example, the computer 1701 may be configured to close a velocity loop as shown in FIG. 10 using the average of the velocity feedback from both wheels 1211, 1212 as the "bot velocity". To improve performance and avoid velocity loop instabilities, the velocity loop may be augmented with torque-feedforward and operated at a low gain. The computer 1701 may also be configured to close a position loop as also shown in FIG. 10 for final position at a stop location of the bot 110. The computer 1701 may also be configured to sum in a differential torque offset to implement line following. It is noted that the drive wheels 1211, 1212 may loose traction with the transfer deck 130A or floor of a picking aisle 130A or transfer area 295 when the flooring surfaces and/or the wheels are contaminated with liquids, dirt or other particulates. The velocity control loop may be configured to mitigate the loss of traction by backing off the torque to both wheels 1211, 1212 whenever feedback provided by, for example, an encoder for one or both wheels 1211, 1212 indicates a velocity higher than a predetermined velocity of the bot 110.

When travelling long distances on, for example, the transfer deck, the bot 110 travels on drive wheels 1211, 1212 and idler wheels 1213, 1214 (or locked casters 1260', 1261') so that the bot is deterred from veering off of the straight line trajectory through the fixed nature of the drive wheels 1211, 1212 and idler wheels 1213, 1214 (or locked casters 1260', 1261'). The computer 1701 may be configured with any suitable line following algorithm to substantially ensure that the bot 110 maintains travel in a straight line. The line following algorithm may also allow for correction of initial line following errors due to, for example, misalignment from turns. In one exemplary embodiment the bot 110 uses line sensors 1712 to estimate its heading and offset from a guidance line 1810-1817. The bot 110 may be configured to use, for example, any suitable algorithm such as a fuzzy logic algorithm to generate corrections in the travel path of the bot 110. The correction may be applied as a differential torque to the wheels as the bot is travelling (e.g. skid steering—rotating one drive wheel slower than the other drive wheel to produce increased drag on one side of the bot for inducing a turning moment on the bot).

For turns, such as for example, substantially right angle turns, the drives for motors 1211M, 1212M may be configured as position controllers. For example the drives may be commanded by the computer 1701 to rotate their respective wheels in opposite directions for a predetermined distance to generate a pivot turn of slightly more than about 90 degrees. When for example, line sensors 1712 detect a stopping guidance line, the turning move is terminated. In alternate embodiments the drives for the motors 1211M, 1212M may be operated in any suitable manner for driving the bot in substantially straight lines or during turns.

FIGS. 9A and 9B illustrate an exemplary turn sequence for a substantially 90 degree turn made by the bot 110 while transitioning onto the transfer deck 130B from a picking aisle 130A. In this example, the bot is traveling in a forward orientation in the direction of arrow 1910. As the bot 110 exits the picking aisle 130A, the bot 110 lowers the casters 1260, 1261 (FIG. 4A) so that the idler wheels 1213, 1214 are lifted off of the transfer deck 130B (or unlocks casters 1260', 1261'). Using line sensors 1712 located at for example the driven end 1299 of the bot 110, the bot 110 detects the inner travel lane guidance line 1814 and then using corrected wheel odometry, stops with its pivot point P at or close to the outer travel lane guidance line 1813. The bot 110 rotates about 90 degrees in the direction of arrow 1920 using a differential torque in the drive motors 1211M, 1212M to turn the drive wheels 1211, 1212 in opposite directions such that the bot 110 rotates about point P. The bot 110 detects the guidance line 1813 with the line sensors 1712 and terminates the turn. The bot 110 raises the casters 1260, 1260 so that the idler wheels 1213, 1214 contact the transfer deck 130B (or locks casters 1260', 1261') and proceeds to follow guidance line 1813 using, for example, line following. It is noted that turning of the bot to enter, for example, picking aisle 130A may occur in substantially the same manner as that described above for exiting the picking aisle 130A.

Figure 11A:
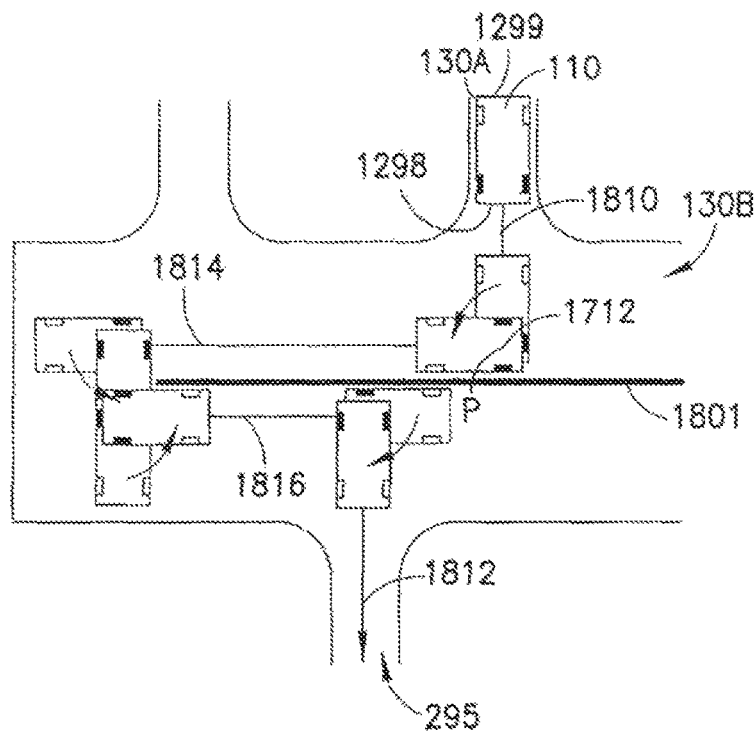

FIGS. 11A-13B illustrate exemplary travel paths of a bot 110 including straight line travel and turn sequences. It is noted that while the specific examples of bot travel are shown and described, the bot 110 may be configured to perform any suitable number of turns and transition between any suitable number of travel lanes in any suitable manner for travelling throughout a respective level of the storage structure 130. FIG. 11A illustrates a travel path of the bot 110 where the bot 110 transitions from one, for example, picking aisle (or transfer station), across the transfer deck 130B and into a transfer area 295 (or other picking aisle) with the bot 110 transitioning from a reverse orientation (e.g. drive end 1298 leading) to a forward orientation (e.g. drive end 1298 trailing). In this example, the bot 110 exits the picking aisle 130A in a reverse orientation such that a line sensor(s) 1712 disposed substantially at pivot point P detects the inner travel lane guidance line 1814. The bot 110 pivots about point P in a counterclockwise direction in a manner substantially similar to that described above with respect to FIGS. 9A and 9B. The bot follows guidance line 1814 in a forward orientation until, for example, line sensors 1712 (located proximately to or at one or more of the drive end 1298 and driven end 1299 of the bot 110) detect the crossing of guidance lines 1814 and 1815 (FIG. 8) at which point the bot 110 pivots counterclockwise about point P in a manner similar to that described above so that the bot follows line 1815 substantially to a point where guidance line 1815 crosses the inner travel lane guidance line 1816. At the crossing of guidance lines 1815, 1816 the bot 110 pivots counterclockwise to follow guidance line 1816. The bot follows guidance line 1816 until the line sensors 1712 detect a crossing of guidance lines 1816 and 1812 at which point the bot pivots clockwise to enter transfer area 295 in a forward orientation.

Figure 11B:
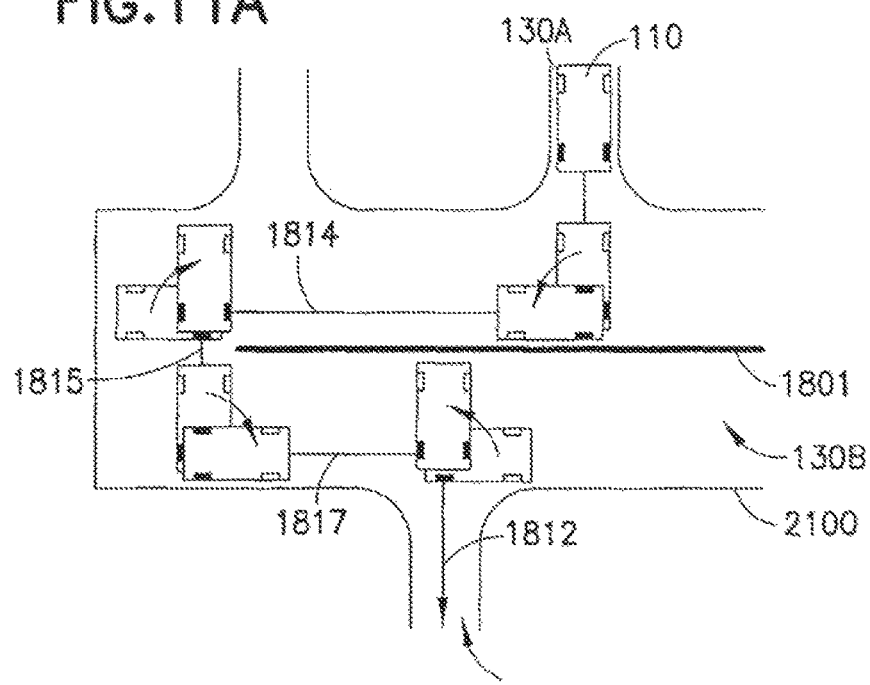

FIG. 11B illustrates an exemplary travel path of the bot 110 where the bot exits the picking aisle 130A in a reverse orientation and enters transfer area 295 in a reverse orientation. In this example, the motion of the bot is substantially similar to that described above with respect to FIG. 11A, however, after travelling around wall 1801 the bot transitions to the outer travel lane guidance line 1817 so that the bot 110 is in a reverse orientation. The reverse orientation of the bot 110 allows the bot to pivot counterclockwise into an open area of the transfer deck 130B for entering the transfer area 295 in a forward orientation without colliding with the outside wall 2100 of the transfer deck 130B.

Figure 11C:
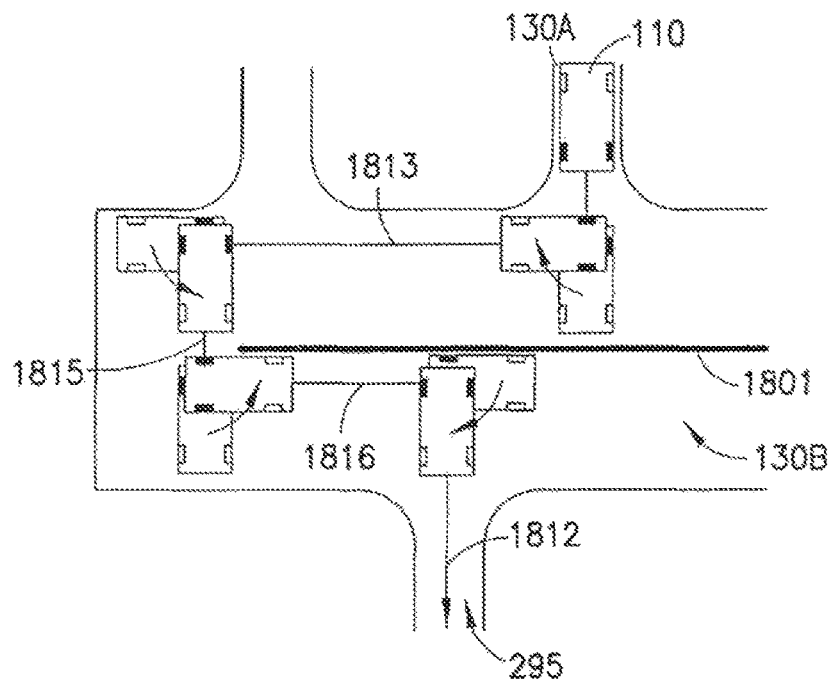

FIG. 11C illustrates the bot 110 exiting the picking aisle 130A in a forward orientation and entering transfer area 295 in a forward orientation. The motion of the bot is substantially similar to that described above however, in this example, the bot 110 transitions from outer travel lane guidance line 1813 to inner travel lane guidance line 1816 so that the bot can enter the transfer area 295 in a forward orientation.

Figure 11D:
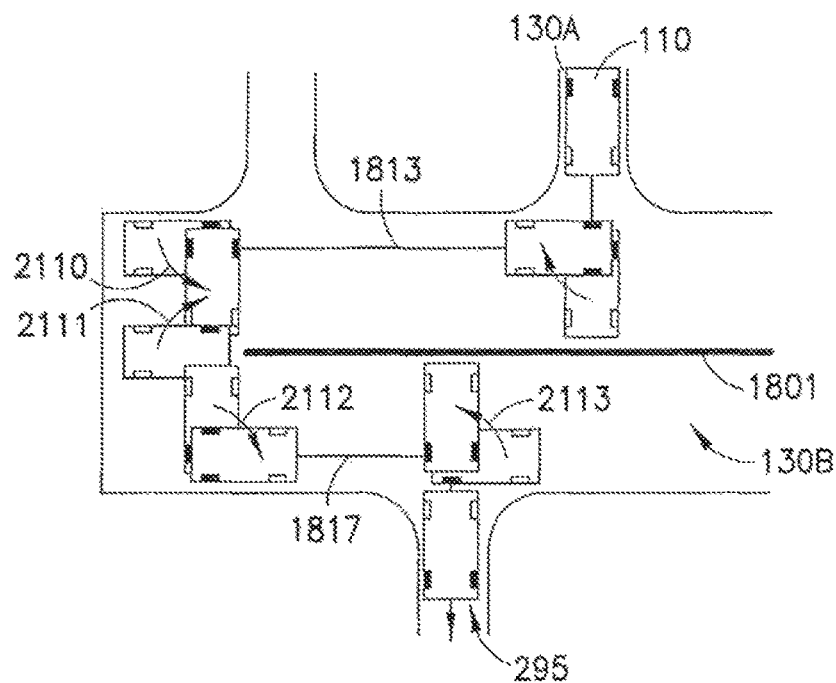
Figure 11E:
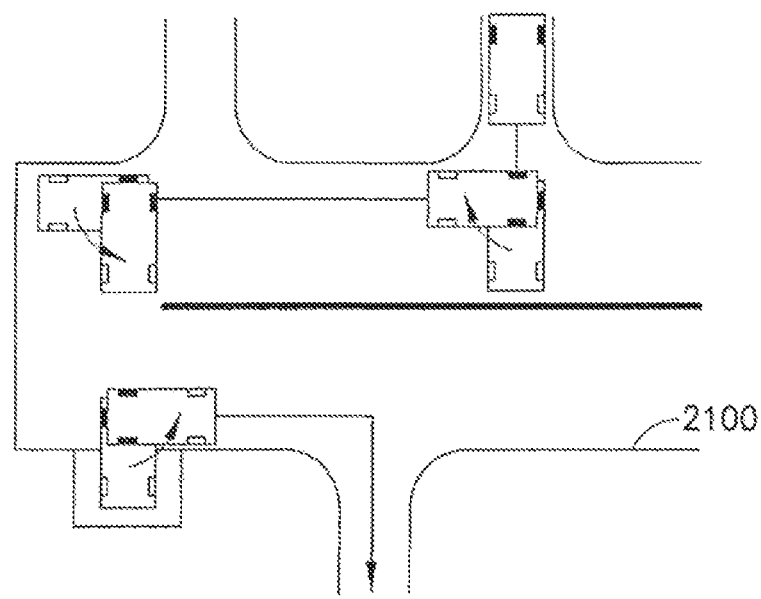

FIGS. 11D and 11E illustrate the bot 110 exiting the picking aisle 130A in a forward orientation and entering the transfer area 295 in a reverse orientation using the outer travel lane guidance lines 1813 and 1817. The motion of the bot 110 may be substantially similar to that described above, however as the bot 110 travels along guidance line 1815 the bot 110 makes three turns 2110-2112 (e.g. where turns 2110, 2111 turn the bot substantially 180 degrees along guidance line 1815) to orient the bot 110 for making the final turn 2113 into the transfer area 295. As can be seen in FIG. 11E, without the additional turn the bot 110 would not be able to transition from outer travel lane guidance line 1813 onto outer travel lane guidance line 1817 without colliding with the outer wall 2100 (as indicated by the shaded area) using line following as described herein.

FIGS. 12A and 12B illustrate an exemplary travel path of bot 110 from picking aisle 130A1 to picking aisle 130A2 where travel of the bot 110 within the picking aisle 130A1 is in a forward orientation and travel within picking aisle 130A2 is in a reverse orientation. In this example, the bot uses the outer travel lane guidance line 1813 for transitioning between picking aisles 130A1, 130A2. As can be seen in FIG. 12A when travelling along the outer travel lane guidance line 1813 and entering picking aisle 130A2 the bot pivots in a direction so the driven end 1299 of the bot swings towards the inner travel lane of the transfer deck 130B so as to avoid colliding with the outer wall 2100 as shown in FIG. 12B.

FIGS. 13A and 13B illustrate an exemplary travel path of bot 110 from picking aisle 130A1 to picking aisle 130A2 where travel of the bot 110 within the picking aisles 130A1, 130A2 is in a reverse orientation. In this example, the bot uses the inner travel lane guidance line 1814 for transitioning between picking aisles 130A1, 130A2. As can be seen in FIG. 13A when travelling along the inner travel lane guidance line 1814 the bot pivots in a direction so the driven end 1299 of the bot swings towards the outer travel lane of the transfer deck 130B so as to avoid colliding with the inner wall 1801 as shown in FIG. 13B.

It is noted that the bot may be configured to transition between the tracked travel lanes of the picking aisles 130A and the open transfer deck 130B in any suitable manner. In one exemplary embodiment, the guidance lines 1810-1812 may guide the bot into the tracks 1300 of the picking aisles. In alternate embodiments, one or more of the sensors 1710-1716 may allow the bot 110 to detect, for example, edges or other suitable features of the tracks 1300 (FIG. 3B) and position itself so the bot 110 passes between opposing tracks 1300 with the guide wheels contacting the recesses 1300R in the tracks 1300.

In accordance with one exemplary embodiment, in the above described examples of the bot travel paths, when the bot is turning the bot is supported by the drive wheels 1211, 1212 and the casters 1260, 1261 (or casters 1260', 1261'). The straight line moves of the bot may be made with the bot supported on the drive wheels 1211, 1212 and the idler wheels 1213, 1214 (or casters 1260', 1261'). As noted above, any corrections to the bot travel path while the bot is traveling in a straight line may be made using skid steering. In alternate embodiments, the bot may travel in a straight line path with the casters 1260, 1261 deployed. In still other alternate embodiments, correction to the bots straight line travel paths may be made through steerable wheels.

Referring again to FIG. 7, the bot 110 can determine its position within the storage and retrieval system 100 for transitioning through the storage structure 130 as described above through, for example, bot localization. In one exemplary embodiment bot localization may be derived through one or more of bot odometrey, slat counting, index counting and bar code reading. As described above, the bot odometry may be provided from encoders associated with, for example, wheels 1211-1214 (FIG. 2). It is noted that encoder information from each wheel 1211-1214 may be averaged and scaled in any suitable manner to provide a distance traveled by the bot. In alternate embodiments, the distance traveled by the bot may be obtained from the wheel encoder information in any suitable manner. The slat counting may be provided by, for example, the slat sensors 1711 as the bot travels through the picking aisles. The slat counting may supplement the odometry information when the bot is within the picking aisles. The index counting may be provided, by for example, the line sensors 1712 as the bot passes over crossed sections of the guidance lines 1810-1817 (FIG. 8). The index counting may supplement the bot odometry when the bot is traveling on the transfer deck 130B. Bar code reading may be provided by bar code scanner 1710. The bar code reading may be configured to allow the bot 110 to determine an initial position of the bot such as when the bot is powered up from an off or dormant state. The bar codes may be located at transfer stations 140A, 140B (FIG. 1) or any other suitable location within the storage structure 130 for initializing the bot 110. Bar codes may also be located within the picking aisles and on the transfer deck to, for example, confirm bot location and correct for missed slats or indexes. The on-board computer 1701 of the bot 110 may be configured to use any suitable combination of bot odometrey, slat counting, index counting and bar code reading to determine the bot's 110 position within the storage structure 130. In alternate embodiments, the computer 1701 may be configured to determine the location of the bot using only one or any suitable combination of bot odometrey, slat counting, index counting and bar code reading. In still other alternate embodiments, the location of the bot may be determined in any suitable manner such as through, for example, an indoor spatial positioning system. The indoor spatial positioning system may be substantially similar to a global positioning system and use any suitable technique for determining the position of an object such as, for example, acoustic, optical, or radio frequency signaling.

In one exemplary embodiment, one or more of the sensors 1710-1716 described above may allow for dynamic positioning of bots 110 within the picking aisles 130A in any suitable manner. The position at which the bot 110 is stopped for dynamically allocating case units may be determined by, for example, the control server 120 (FIG. 1), the control system 1220 of the bot or by a combination thereof. For example, dynamic allocation of the storage space may be determined by, for example, the control server 120 in any suitable manner such that any open storage spaces in the storage structure 130 are filled with items having a size capable of fitting within those open storage spaces. The control server may communicate to the appropriate components of the storage and retrieval system 100, for example, a location of a predetermined storage location and an appropriately sized case unit or case units for placement in the predetermined storage location. That case unit may be transferred into the storage and retrieval system 100 where a bot 110 delivers the case unit to the predetermined storage location. As a non-limiting example, the sensors 1710-1716 of the bots 110 may count slats 620L1, 620L2 (FIG. 5A) and/or detect edges of case units on the storage shelves for dynamically positioning the bots for placing the case unit in the predetermined storage location. Dynamically positioning the bots 110 and/or the dynamic allocation of shelf storage space may allow for the positioning of case units having varying lengths in each storage bay 5000, 5001 (FIGS. 14A and 14B) such that the use of the storage space is maximized. For example, FIG. 14A illustrates a storage bay 5000 divided into storage slots S1-S4 as is done in conventional storage systems. The size of the storage slots S1-S4 may be a fixed size dependent on a size of the largest case unit (e.g. case unit 5011) to be stored on the shelf 600 of the storage bay 5000. As can be seen in FIG. 14A, when case units 5010, 5012, 5013 of varying dimensions, which are smaller than case unit 5011, are placed in a respective storage slot S1, S2, S4 a significant portion of the storage bay capacity, as indicated by the shaded boxes, remains unused. In accordance with an exemplary embodiment, FIG. 14B illustrates a storage bay 5001 having dimensions substantially similar to storage bay 5000. In FIG. 14B the case units 5010-5016 are placed on the shelf 600 using dynamic allocation. As can be seen in FIG. 14B, dynamically allocating the storage space allows placement of case units 5014-5016 on shelf 600 in addition to case units 5010-5013 (which are the same case units placed in storage bay 5000 described above) such that the unused storage space, as indicated by the hatched boxes, is less than the unused storage space using the fixed slots of FIG. 14A. FIG. 14C illustrates a side by side comparison of the unused storage space for the fixed slots and dynamic allocation storage described above. It is noted that the unused storage space of bay 5001 using dynamic allocation may be decreased even further by decreasing the amount of space between the case units 5010-5016 which may allow for placement of additional case units on the shelf 600. As may be realized, as items are placed within the storage structure the open storage spaces may be analyzed, by for example the control server 120, after each case unit placement and dynamically re-allocated according to a changed size of the open storage space so that additional case units having a size corresponding to (or less than) a size of the re-allocated storage space may be placed in the re-allocated storage space.

Figure 15:
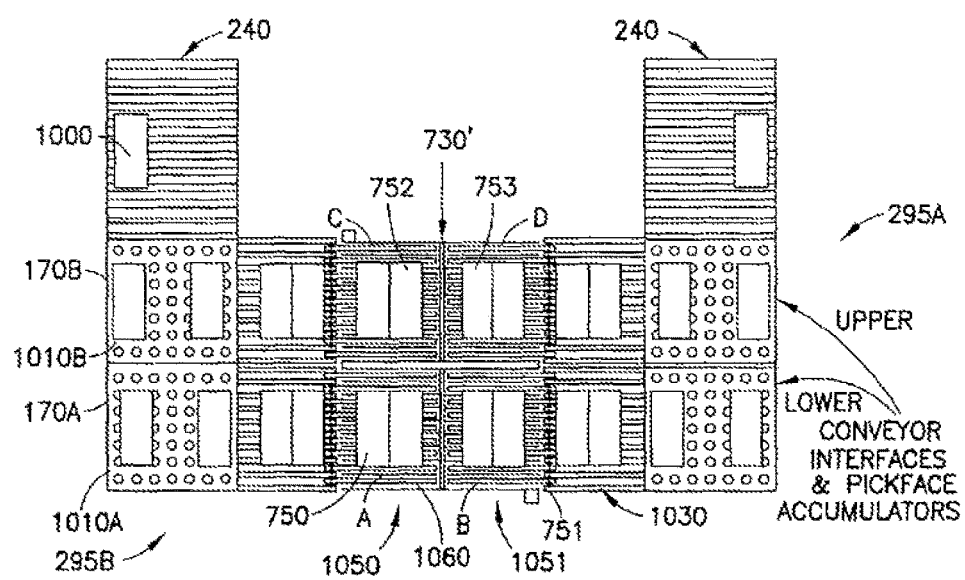
FIG. 15 schematically illustrates a conveyor system in accordance with an exemplary embodiment.
Figure 16A:
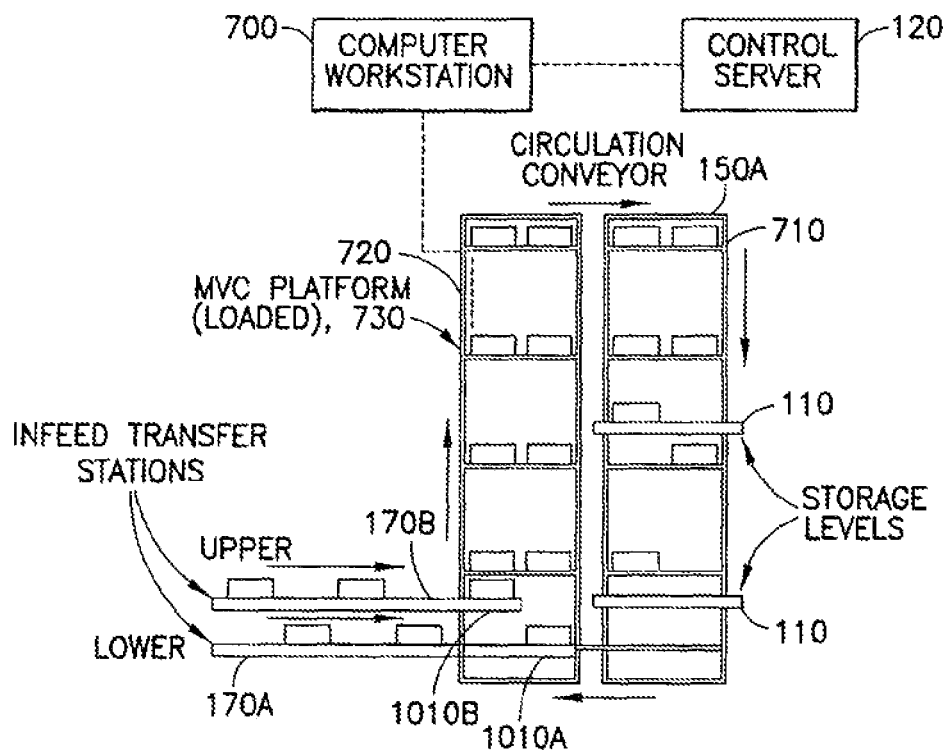
Figure 16B:
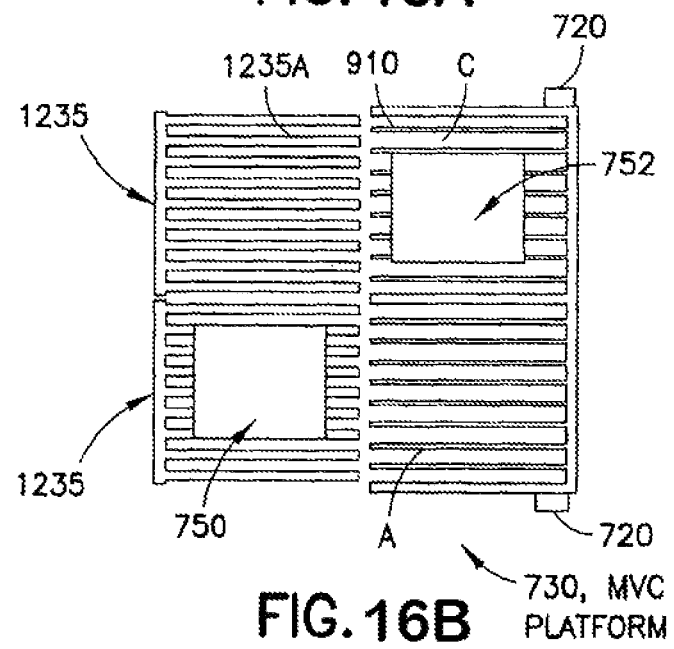

Referring now to FIG. 15, the multilevel vertical conveyors, such as conveyor 150A are supplied with uncontained case units 1000 from in-feed transfer stations 170 (FIG. 1). As described above, the in-feed transfer stations 170 may include one or more of depalletizing workstations, conveyors 240, conveyor interfaces/bot load accumulators 1010A, 1010B and conveyor mechanisms 1030. As can be seen in FIG. 15, uncontained case units 1000 are moved from, for example depalletizing workstations by conveyors 240. In this example, each of the positions A-D is supplied by a respective in-feed transfer station. As may be realized, while the transfer of case units is being described with respect to shelves 730' it should be understood that transfer of case units to shelves 730 occurs in substantially the same manner. For example, position A may be supplied by in-feed transfer station 170A and position C may be supplied by in-feed transfer station 170B. Referring also to FIG. 16A the in-feed transfer stations 170A, 170B, for supplying similar sides of the shelf 730 (in this example positions A and C, which are disposed side by side, form a first side 1050 of the shelf 730 and positions B and D, which are disposed side by side, form a second side 1051 of the shelf 730), may be located one above the other in a horizontally staggered stacked arrangement (an exemplary stacked arrangement is shown in FIG. 16A). In other exemplary embodiments, the stacked arrangement may be configured so that the in-feed transfer stations are disposed vertically in-line one above the other and extend into the multilevel vertical conveyors by different amounts for supplying, for example, positions A and B or positions C and D where positions A and B (and positions C and D) are disposed one in front of the other, rather than side by side. In alternate embodiments, the in-feed transfer stations may have any suitable configuration and positional arrangement. As can be seen in FIG. 15, the first side 1050 and second side 1051 of the shelf 730 are loaded (and unloaded) in opposing directions such that each multilevel vertical conveyor 150A is located between respective transfer areas 295A, 295B where the first side 1050 interfaces with a transfer area 295B and the second side 1051 interfaces with transfer area 295A.

In this exemplary embodiment, the accumulators 1010A, 1010B are configured to form the uncontained case units 1000 into the individual pick faces 750-753 prior to loading a respective position A-D on the multilevel vertical conveyor 730. In one exemplary embodiment, the computer workstation 700 and/or control server 120 may provide instructions or suitably control the accumulators 1010A, 1010B (and/or other components of the in-feed transfer stations 170) for accumulating a predetermined number of items to form the pickfaces 750-753. The accumulators 1010A, 1010B may align the case units in any suitable manner (e.g. making one or more sides of the items flush, etc.) and, for example, abut the items together. The accumulators 1010A, 1010B may be configured to transfer the pickfaces 750-753 to respective conveyor mechanisms 1030 for transferring the pickfaces 750-753 to a respective shelf position A-D. In one exemplary embodiment the conveyor mechanisms 1030 may include belts or other suitable feed devices for moving the pickfaces 750-753 onto transfer platforms 1060. The transfer platforms 1060 may include spaced apart fingers for supporting the pickfaces 750-753 where the fingers 910 of the shelves 730 are configured to pass between the fingers of the transfer platforms 1060 for lifting (or placing) the pickfaces 750-753 from the transfer platforms 1060. In another exemplary embodiment, the fingers of the transfer platforms 1060 may be movable and serve to insert the pickfaces 750-753 into the path of the shelves 730 in a manner similar to that described below with respect to the bot transfer stations 140. In alternate embodiments the in-feed transfer stations 170 (and out-feed transfer stations 160) may be configured in any suitable manner for transferring case units (e.g. the pickfaces formed by the case units) onto or from respective multilevel vertical conveyors 150A, 150B.

It is noted that while the interface between the bot transfer stations 140 and the multilevel vertical conveyors 150A, 150B are described it should be understood that interfacing between the bots 110 and the multilevel vertical conveyors 150A, 150B occurs in a substantially similar manner (e.g. as described in U.S. patent application Ser. No. 12/757,312, entitled "AUTONOMOUS TRANSPORTS FOR STORAGE AND RETRIEVAL SYSTEMS," previously incorporated by reference herein in its entirety). For exemplary purposes only, referring now to FIGS. 16B and 17A-17D, the multilevel vertical conveyors 150A transfer pickfaces 750, 752 from, for example, the in-feed transfer stations 170 (or any other suitable device or loading system) to, for example, the bot transfer stations 140 associated with each of the levels in the storage structure 130. In other examples, the pickfaces 750, 752 may be transferred directly from the multilevel vertical conveyors 150A to the bots 110 as described below. As may be realized, the bot transfer stations 140 are disposed on respective levels of the storage structure adjacent the path of travel of the shelves 730 of a respective multilevel vertical conveyor 150A. In one exemplary embodiment, there may be a bot transfer station 140 corresponding to each of the positions A and C on the shelves 730 (and positions A-D with respect to shelf 730'). For example, a first bot transfer station 140 may remove load 750 from position A on shelf 730 while another bot transfer station 140 may remove pickface 752 from position C on shelf 730 and so on. In other exemplary embodiments, one bot transfer station 140 may serve to remove or place case units in more than one position A, C on the shelves 730. For example, one bot transfer station 140 may be configured for removing pickfaces 750, 752 from one or more of positions A, C of shelf 730. In alternate embodiments, referring also to FIG. 15, one bot transfer station 140 may be configured for removing pickfaces 750, 752 from one or more of positions A, C on a first side 1050 of the shelf 730' while another bot transfer station 140 may be configured to remove pickfaces 751, 753 from one or more positions B, D on a second side 1051 of the shelf 730'. In alternate embodiments the bot transfer stations 140 may have any suitable configuration for accessing any suitable number of positions A-D of the shelves 730, 730'.

Each bot transfer station 140 may include a frame 1100, one or more drive motors 1110 and a carriage system 1130. The frame 1100 may have any suitable configuration for coupling the bot transfer station 140 to, for example, any suitable supporting feature of the storage structure 130, such as a horizontal or vertical support. The carriage system 1130 may be movably mounted to the frame 1100 through, for example, rails 1120 that are configured to allow the carriage system 1130 to move between retracted and extended positions as shown in FIGS. 17A and 17B. The carriage system 1130 may include a carriage base 1132 and fingers 1135. The fingers 1135 may be mounted to the carriage base 1132 in a spaced apart arrangement so that the fingers 1135 extend from the carriage base 1132 in a cantilevered fashion. It is noted that each finger 1135 may be removably mounted to the carriage base 1132 for facilitating replacement or repair of individual fingers 1135. In alternate embodiments the fingers and carriage base may be of unitary one-piece construction. The fingers 1135 of the bot transfer stations 140 may be configured to pass between the fingers 910 (FIG. 16B) of the shelves 730 of the multilevel vertical conveyors 150A (FIG. 1) for removing pickfaces such as pickfaces 1150 (which may be substantially similar to pickfaces 750-753) from the shelves 730. The bot transfer station 140 may also include a load positioning device 1140 that retractably extends between, for example, the spaced apart fingers 1135 in the direction of arrow 1181 for effecting positioning of the pickfaces 1150 in a predetermined orientation relative to the bot transfer station 140. In still other alternate embodiments the carriage system 1130 may have any suitable configuration and/or components. The one or more drive motors 1110 may be any suitable motors mounted to the frame 1100 for causing the extension/retraction of the carriage system 1130 and the extension/retraction of the positioning device 1140 in any suitable manner such as by, for exemplary purposes only, drive belts or chains. In alternate embodiments, the carriage system and positioning device may be extended and retracted in any suitable manner.

Figure 17D:
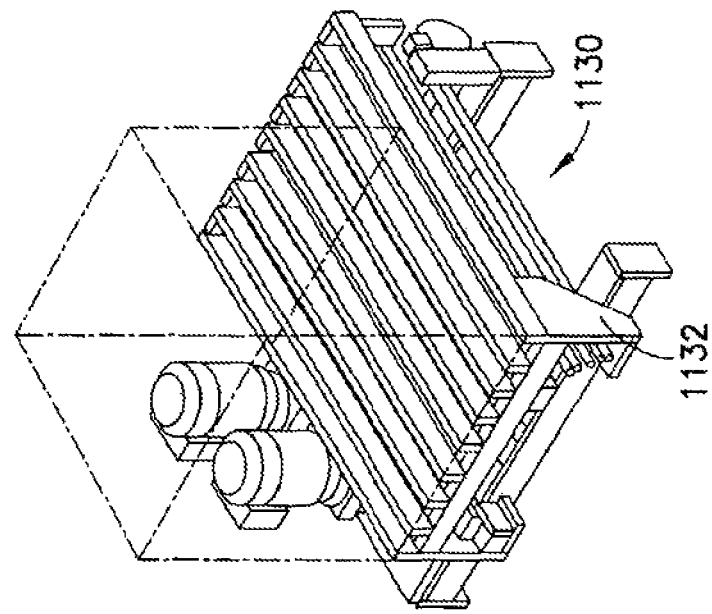
Figure 17C:
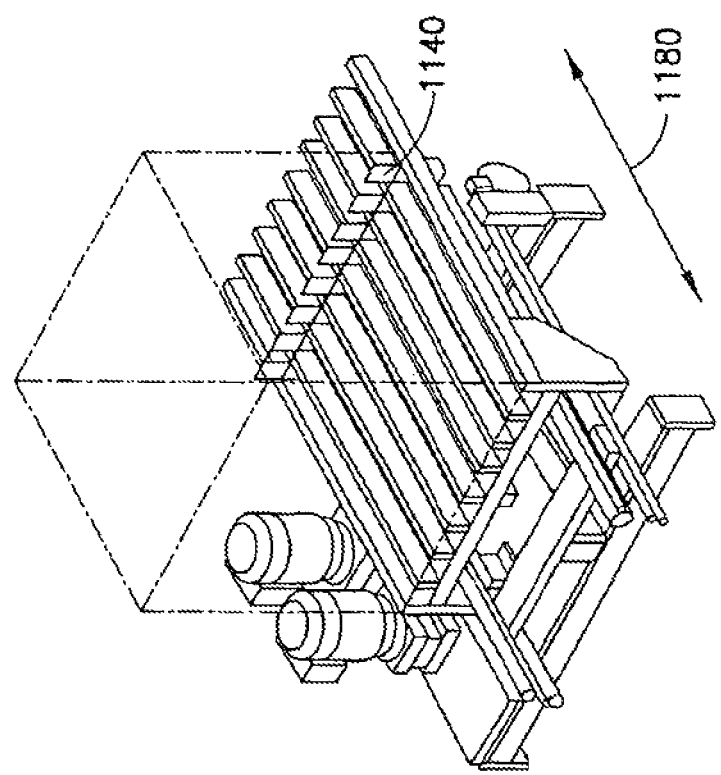

In operation, referring also to FIGS. 16C, 16D, 18A and 18B, inbound pickfaces (e.g. pickfaces, which include one or more case units, that are being transferred into the storage and retrieval system) such as pickface 1150 are loaded on and will circulate around the multilevel vertical conveyor 150A and be removed from a respective conveyor by, for example, one or more bots 110 for placement in a storage area of the storage structure. As will be described further below, in the exemplary embodiments the input loading sequencing of case units onto the multilevel vertical conveyors 150A, 150B (e.g. such as at corresponding feeder input sides of transfer stations 170 and bot transfer locations on respective storage levels) may be substantially independent from the output or unloading sequence of the multilevel vertical conveyors 150A, 150B (e.g. such as at corresponding output sides of transfer stations 160 and bot transfer locations on respective storage levels) and vice versa. In one example, the pickface 1150 may be loaded onto the shelves 730 during an upward travel of the multilevel vertical conveyor 150A and off loaded from the shelves 730 during downward travel of the multilevel vertical conveyor 150A. By way of example, multilevel vertical conveyor shelves 730*i* and 730*ii* (FIG. 16D) may be loaded sequentially, but when unloaded, shelf 730*ii* may be unloaded before shelf 730*i*. It is noted that the shelves 730 may be loaded through one or more cycles of the multilevel vertical conveyor. In alternate embodiments the pickfaces may be loaded or off loaded from the shelves 730 in any suitable manner. As may be realized, the position of the case units on the multilevel vertical conveyor shelf 730 defines the pickface position that the bot 110 picks from. The bot may be configured to pick any suitable load or pickface from the shelf 730 regardless of the pickface position on the shelf 730 or the size of the pickface. In one exemplary embodiment, the storage and retrieval system 100 may include a bot positioning system for positioning the bot adjacent the shelves 730 for picking a desired pickface from a predetermined one of the shelves 730 (e.g. the bot 110 is positioned so as to be aligned with the pickface). The bot positioning system may also be configured to correlate the extension of a bot transfer arm with the movement (e.g. speed and location) of the shelves 730 so that the transfer arm is extended and retracted to remove (or place) pickfaces from predetermined shelves 730 of the multilevel vertical conveyors 150A, 150B. For exemplary purposes only, the bot 110 may be instructed by, for example, the computer workstation 700 or control server 120 (FIG. 16A) to extend the transfer arm into the path of travel of the pickface 1150. As the pickface 1150 is carried by the multilevel vertical conveyor 150A in the direction of arrow 860 fingers of the bot the transfer arm (which may be substantially similar to fingers 1135 of the bot transfer station 140) pass through the fingers 910 of the shelf 730 for transferring the pickface 1150 from the shelf 730 to the carriage system 1135 (e.g. the pickface 1150 is lifted from the fingers 910 via relative movement of the shelf 730 and the bot transfer arm). As may be realized, the pitch P between shelves may be any suitable distance for allowing the transfer of pickfaces between the multilevel vertical conveyor and the bots 110 while the shelves 730 are circulating around the multilevel vertical conveyor at a substantially continuous rate. The bot transfer arm may be retracted (in a manner substantially similar to that shown in FIGS. 17C, 17D with respect to the bot transfer station 140) so that the pickface 1150 is no longer located in the path of travel of the shelves 730 of the multilevel vertical conveyor 150A. It is noted that in alternate embodiments, where the bot transfer stations 140 are used, the positioning device 1140 may be extended through the fingers 1135 and the carriage system 1130 (FIGS. 17A-17D) may be moved in the direction of arrow 1180 for abutting the pickface 1150 against the positioning device 1140 effecting positioning of the pickface 1150 in a predetermined orientation relative to, for example, the bot transfer station 140. The carriage system 1130 may be fully retracted as shown in FIG. 17D for transfer of the pickface 1150 to a bot 110.

Figure 18A:
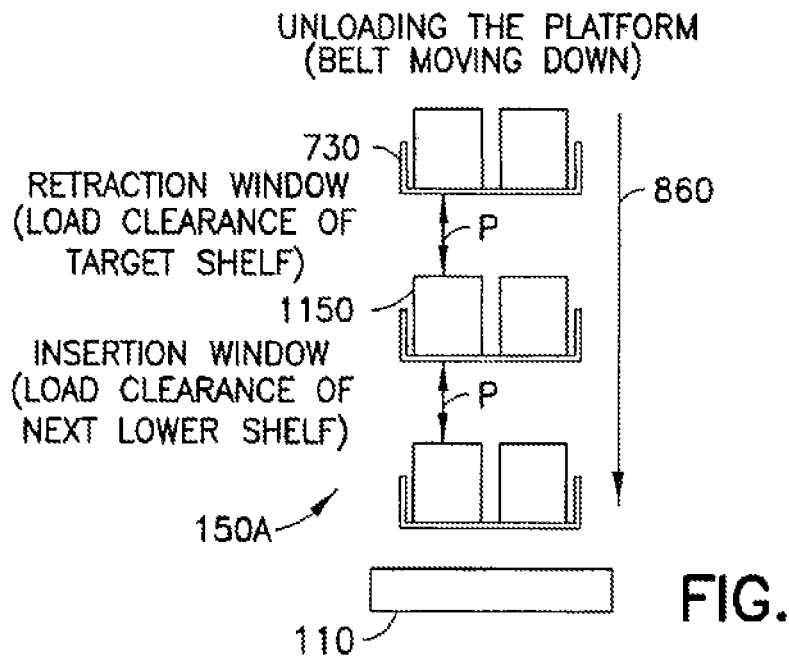
FIGS. 18A and 18B illustrate schematic views of a conveyor system in accordance with an exemplary embodiment.
Figure 18B:
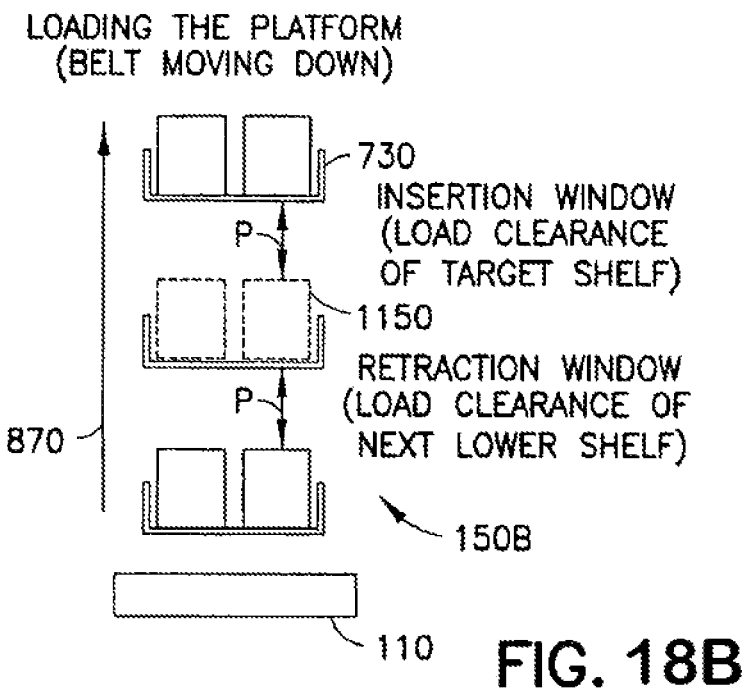

Referring to FIGS. 16D and 18B, for transferring loads in the outbound direction (e.g. moving pickfaces from or out of the storage and retrieval system) the bots 110 pick one or more pickface, such as pickface 1150, from a respective predetermined storage area of the storage structure. The pickfaces may be extended into the path of the shelves 730 of the multilevel vertical conveyor 150B (which is substantially similar to conveyor 150A) by the transfer arm of bot 110 through an extension of the bot transfer arm relative to a frame of the bot 110. It is noted that the pickfaces, such as pickface 1150, may be placed on the multilevel vertical conveyor 150 in a first predetermined order sequence. The first predetermined order may be any suitable order. The substantially continuous rate of movement of the shelves 730 in the direction of arrow 870 cause the fingers 910 of the shelf 730 to pass through the fingers of the bot transfer arm such that the movement of the shelf 730 effects lifting the pickface 1150 from the fingers of the bot transfer arm. The pickface 1150 travels around the multilevel vertical conveyor 150B to an out-feed transfer station 160 (which is substantially similar to in-feed transfer station 170) where is it removed from the shelf 730 by a conveyor mechanism 1030 in a manner substantially similar to that described above. The pickfaces may be removed from the multilevel vertical conveyor 150B by, for example the out-feed transfer stations 160 in a second predetermined order sequence that may be different and independent from the first predetermined order sequence. The second predetermined order sequence may depend on any suitable factors such as, for example, the store plan rules described below.

It is noted that the respective transfer of pickfaces between the multilevel vertical conveyors 150A, 150B and the in-feed and out-feed transfer stations 170, 160 may occur in a manner substantially similar to that described above with respect to the bots 110 and bot transfer stations 140. In alternate embodiments transfer of pickfaces between the multilevel vertical conveyors 150A, 150B and the in-feed and out-feed transfer stations 170, 160 may occur in any suitable manner.

It should be understood that the exemplary embodiments described herein may be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An automated case unit storage system for handling case units that are adapted for being palletized for shipping to or from a storage facility, the automated case unit storage system comprising:

an array of multilevel storage racks having predefined storage areas at each rack level so that at least one corresponding predetermined storage area is disposed in a common level of each rack level;

a controller configured to effect dynamic allocation of case units of dissimilar sizes into dynamically allocated and sized storage areas of the at least one corresponding storage area on each rack level in the array of multilevel storage racks, wherein at least one case unit of the case units of dissimilar sizes is an individual item unit or includes more than one individual item in the at least one case unit; and an independent autonomous transport vehicle operatively connected to the controller, the independent autonomous transport vehicle being configured for independently traversing an aisle or deck within one level of the multilevel storage racks and for transferring the case units to or from the predefined storage areas, the independent autonomous transport vehicle including an independent frame,
a support shelf adapted for holding at least one case unit thereon, the support shelf being movably connected to the independent frame so that the support shelf is movable between extended and retracted positions,
a drive system mounted to the independent frame, and guiding devices mounted to the independent frame;
where the independent autonomous transport vehicle is configured to effect dynamic allocation of the case units of dissimilar sizes into the dynamically allocated and sized storage areas so that a mix of the dissimilarly sized case units, including the at least one case unit, are each disposed by the autonomous transport vehicle into corresponding dissimilarly sized storage areas of the dynamically allocated and sized storage areas of the common level of the at least one corresponding storage area of each rack level of the multilevel storage racks in the array of the multilevel storage racks.

2. The automated case unit storage system of claim 1, wherein the dynamic allocation of case units comprises the independent autonomous transport vehicle being configured to stop at a dynamically determined position along picking aisles of the array of multilevel storage racks for aligning at least a portion of the support shelf with the at least one case unit or empty space located in the array of multilevel storage racks for effecting a transfer of the at least one case unit between the support shelf and a storage area corresponding to one of the at least one case unit or empty space.

3. The automated case unit storage system of claim 1, wherein the array of multilevel storage racks comprise a floor having tracked transport areas for guiding the independent autonomous transport vehicle through tracked and un-tracked transport areas, the independent autonomous transport vehicle being configured to transition between the tracked transport areas and the un-tracked transport areas, the guiding devices including at least one sensor configured to sense at least one feature of the un-tracked transport areas for contactlessly guiding the independent autonomous transport vehicle in the un-tracked transport areas.

4. The automated case unit storage system of claim 1, wherein the independent autonomous transport vehicle includes a lifting device for lifting and lowering the support shelf for transferring the at least one case unit to or from the dynamically allocated and sized storage areas.

5. The automated case unit storage system of claim 1, wherein the independent frame has a first end and a second end, the independent autonomous transport vehicle further includes a pair of individually operable drive wheels disposed at the first end and driven by the drive system and a pair of idler wheels disposed at the second end.

6. The automated case unit storage system of claim 1, further comprising:
a vertical lift configured to transport case units to predetermined levels of the array of multilevel storage racks, the vertical lift comprising slatted transport shelves adapted for holding case units thereon, the independent autonomous transport vehicle being configured to directly or indirectly place or remove case units from the transport shelves of the vertical lift.

7. A method for handling case units that are adapted for being palletized for shipping to or from a storage facility, the method comprising:
providing an array of multilevel storage racks having predefined storage areas at each rack level so that at least one corresponding predetermined storage area is disposed in a common level of each rack level;
providing case units of dissimilar sizes for storage in the array of multilevel storage racks, wherein at least one case unit of the case units of dissimilar sizes is an individual item unit or includes more than one individual item in the at least one case unit;
effecting with a controller, dynamic allocation of the case units of dissimilar sizes into dynamically allocated and sized storage areas of the at least one corresponding storage area on each rack level in the array of multilevel storage racks; and
transferring the at least one case unit to or from the predefined storage areas with an independent autonomous transport vehicle operatively connected to the controller, the independent autonomous transport vehicle being configured for independently traversing an aisle or deck within one level of the multilevel storage racks and including
an independent frame,
a support shelf adapted for holding at least one case unit thereon, the support shelf being movably connected to the independent frame so that the support shelf is movable between extended and retracted positions,
a drive system mounted to the independent frame, and guiding devices mounted to the independent frame; and
effecting, with the independent autonomous transport vehicle, dynamic allocation of the case units of dissimilar sizes into the dynamically allocated and sized storage areas so that a mix of the dissimilarly sized case units, including the at least one case unit, are each disposed by the autonomous transport vehicle into corresponding dissimilarly sized storage areas of the dynamically allocated and sized storage areas of the common level of the at least one corresponding storage area of each rack level of the multilevel storage racks in the array of the multilevel storage racks.

8. The method of claim 7, wherein the dynamic allocation of case units comprises stopping the independent autonomous transport vehicle at a dynamically determined position along picking aisles of the array of multilevel storage racks for aligning at least a portion of the support shelf with the at least one case unit or empty space located in the array of multilevel storage racks for effecting a transfer of the at least one case unit between the support shelf and a storage area corresponding to one of the at least one case unit or empty space.

9. The method of claim 7, wherein the array of multilevel storage racks comprises a floor having tracked transport areas for guiding the independent autonomous transport vehicle through tracked and un-tracked transport areas, the independent autonomous transport vehicle being configured to transition between the tracked transport areas and the un-tracked transport areas, the guiding devices including at least one sensor, the method further comprising sensing at least one feature of the un-tracked transport areas for contactlessly guiding the independent autonomous transport vehicle in the untracked transport areas.

10. The method of claim 7, wherein the independent autonomous transport vehicle includes a lifting device for lifting and lowering the support shelf for transferring the at least one case unit to or from the dynamically allocated and sized storage areas.

11. The method of claim 7, wherein the independent frame has a first end and a second end, the independent autonomous transport vehicle further includes a pair of individually operable drive wheels disposed at the first end and driven by the drive system and a pair of idler wheels disposed at the second end.

12. The method of claim 7, further comprising:
providing a vertical lift configured to transport case units to predetermined levels of the array of multilevel storage racks, the vertical lift comprising slatted transport shelves adapted for holding case units thereon, the independent autonomous transport vehicle being configured to directly or indirectly place or remove case units from the transport shelves of the vertical lift.

\* \* \* \* \*